United States Patent
Ronnekleiv et al.

(10) Patent No.: US 7,916,303 B2
(45) Date of Patent: Mar. 29, 2011

(54) NON-UNIFORM SAMPLING TO EXTEND DYNAMIC RANGE OF INTERFEROMETRIC SENSORS

(75) Inventors: Erlend Ronnekleiv, Trondheim (NO); Ole Henrik Waagaard, Trondheim (NO)

(73) Assignee: Optoplan AS, Trondheim (NO)

( * ) Notice: Subject to any disclaimer, the term of this patent is extended or adjusted under 35 U.S.C. 154(b) by 454 days.

(21) Appl. No.: 11/939,366

(22) Filed: Nov. 13, 2007

(65) Prior Publication Data

US 2009/0122319 A1    May 14, 2009

(51) Int. Cl.
*G01B 9/02* (2006.01)
(52) U.S. Cl. .......................................... 356/477
(58) Field of Classification Search .......... 356/477–482, 356/493, 506, 519
See application file for complete search history.

(56) References Cited

U.S. PATENT DOCUMENTS

| | | | |
|---|---|---|---|
| 6,005,664 A * | 12/1999 | Korenberg et al. | 356/451 |
| 6,154,308 A * | 11/2000 | Hall | 359/325 |
| 6,522,797 B1 * | 2/2003 | Siems et al. | 385/12 |
| 6,606,186 B2 | 8/2003 | Maas | |
| 7,019,837 B2 | 3/2006 | Waagaard | |
| 7,081,959 B2 | 7/2006 | Waagaard et al. | |
| 7,088,878 B2 | 8/2006 | Waagaard et al. | |
| 2005/0046860 A1 * | 3/2005 | Waagaard et al. | 356/478 |
| 2005/0271395 A1 * | 12/2005 | Waagaard et al. | 398/189 |
| 2006/0181711 A1 | 8/2006 | Waagaard et al. | |

* cited by examiner

*Primary Examiner* — Tarifur Chowdhury
*Assistant Examiner* — Jonathan M Hansen
(74) *Attorney, Agent, or Firm* — Patterson & Sheridan, L.L.P.

(57) ABSTRACT

Methods and apparatus for interrogating optical sensors with high slew rates using non-uniform sampling are provided. The transmission of optical signals in a non-uniform pattern is employed to allow for demodulation of fringe rates exceeding the commonly understood Nyquist frequency limit given as one half of the mean sampling frequency. By monitoring the time dependent fringe frequency and assuming that the fringe frequency has a limited bandwidth, only a limited bandwidth smaller than the Nyquist bandwidth around the instantaneous fringe frequency needs to be reconstructed at any time.

21 Claims, 25 Drawing Sheets

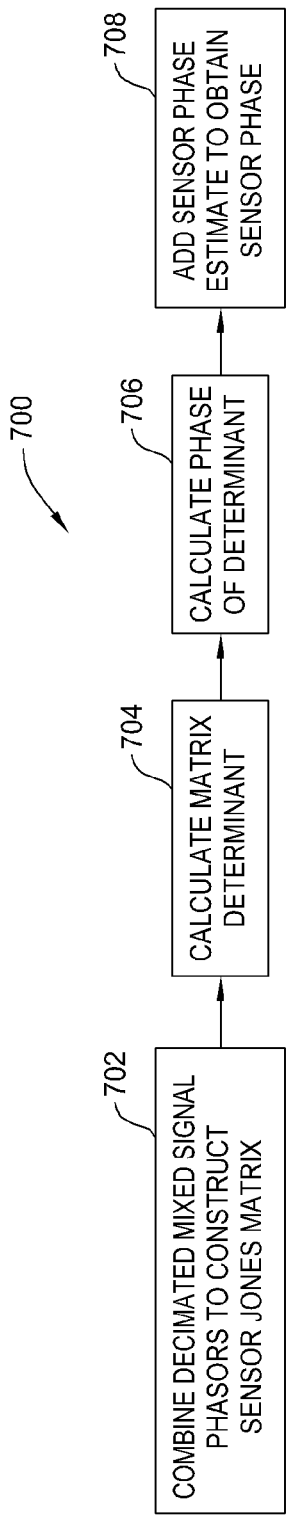
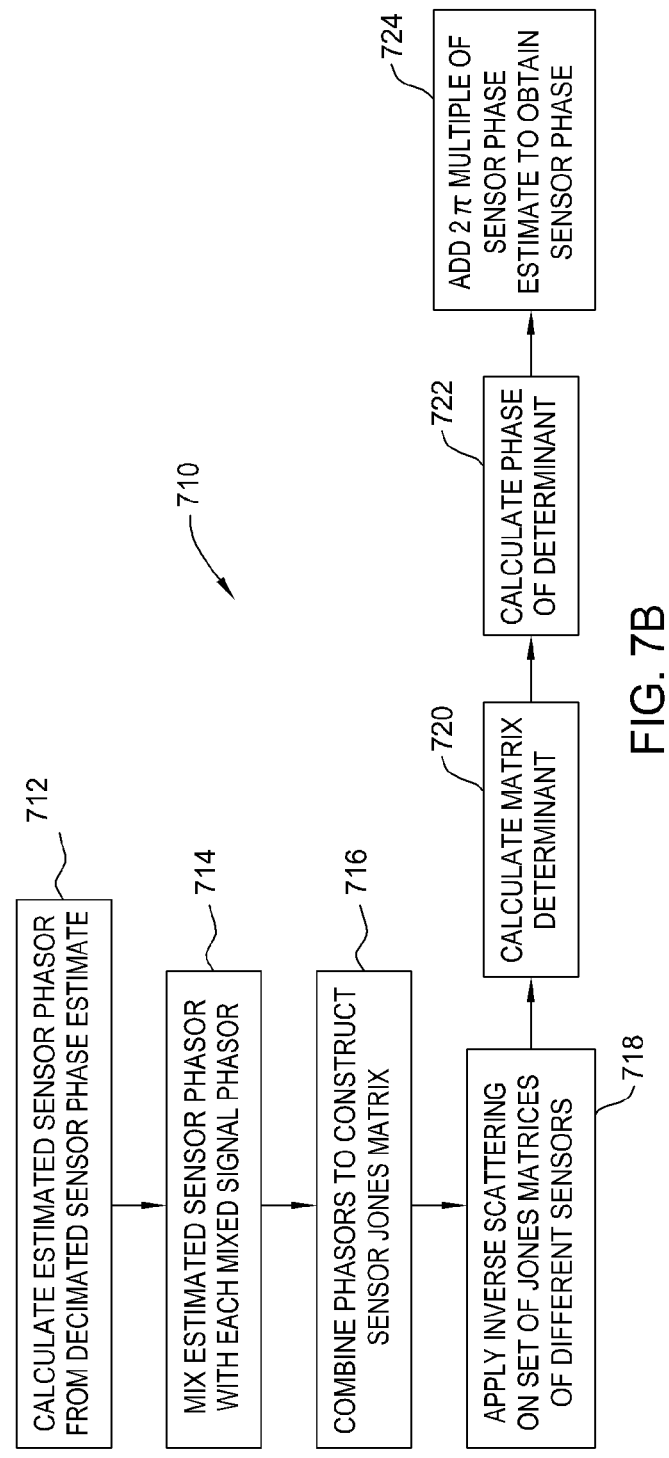
FIG. 7A
FIG. 7B

"SYNCOPATED SAMPLING" OF POLARIZATION CHANNELS

NON-UNIFORM SAMPLING TO EXTEND DYNAMIC RANGE OF INTERFEROMETRIC SENSORS

BACKGROUND OF THE INVENTION

1. Field of the Invention

Embodiments of the present invention generally relate to optical signal processing techniques and, more particularly, to optical signal processing of interrogation signals received from time-division multiplexed (TDM) interferometers.

2. Description of the Related Art

Marine seismic exploration surveys for the exploration and monitoring of hydrocarbon producing zones and reservoirs utilize seismic cables having sensor arrays, i.e., a plurality of sensor stations interconnected by sections of cable. The cable arrays may include a large number of sensor stations (e.g., several hundreds or thousands) and may be buried in a predetermined pattern on the ocean floor. Optical sensors may be particularly well-suited for ocean bottom seismic (OBS) applications, due to their robust nature, lack of sensitive electronics, and potential for lightweight sensors and cable assemblies that are relatively inexpensive to install. An optical sensor station may include a number of interferometric sensors, such as optical hydrophones, accelerometers along multiple axes, and/or geophones.

An interferometric sensor system may comprise a transmitter unit that produces an interrogation signal for the interferometric sensors, a sensor network, and a receiver unit that detects the signals from the sensor network. The sensor network may comprise several optical pathways from its input to its output, and some pairs of optical pathways form sensor interferometers. These optical pathways are called sensor pathways. Each sensor interferometer comprises a sensor and lead paths, the parts of the two sensor pathways that are not common define the sensor, while the common parts define the lead paths. In a fiber optic sensor network the lead paths are called lead fibers. The portion of the lead paths between the transmitter unit and a sensor is called the down-lead path and the portion of the lead paths between a sensor and the receiver unit is called the up-lead path. The portion of the lead paths that are common to both the down-lead path and the up-lead path is called the common lead path, or common lead fiber for a fiber optic sensor network.

The sensors interferometer can be Michelson interferometers, Mach-Zehnder interferometers or Fabry-Perot interferometers. The sensor network can be a number of topologies, including a star network, a ladder network, a transmissive serial array, a serial Michelson array or an inline Fabry-Perot sensor array. The different paths through the sensor network may typically be formed by optical waveguides and splitters like optical fibers, optical splitters, circulators, and other waveguide coupled components, or free space optical paths, mirrors, beam splitters and other bulk components. The time delay difference $\tau_s$ between the two sensor pathways is called the imbalance of that sensor, which is typically equal for all sensors.

The sensor phase, which is the phase delay difference between the two sensor pathways, can be made sensitive to some physical property that one wants to measure. Thus, information about the physical property can be found by using time-division multiplexing (TDM), for example, and extracting the phase of the interference (optically detected as a fringe signal) between the interrogation signal that has propagated the two sensor pathways. TDM of an interferometric sensor network is a form of pulsed interrogation that is achieved by producing light pulses within the transmission unit and transmitting the pulses into the sensor network in one or more pulse transmission time intervals. Signal processing means may periodically measure the phase of the fringe signal to thereby measure changes in the physical property.

A fundamental difference between an interferometric sensor and most electronic sensors is that the phase of a real sinusoidal signal (the fringe signal) is extracted. Not only should the bandwidth of the sensor signal be taken into consideration, but the bandwidth of the fringe signal should also be considered for an interferometric sensor. The bandwidth of the sensor signal may be on the order of a few hundred Hz, for example. For small sensor signals less than 1 rad, the bandwidth of the fringe signal is approximately equal to the bandwidth of the sensor signal.

However, for sensor signals larger than $2\pi$, the bandwidth of the fringe signal is equal to the derivative of the phase, i.e., the slew rate of the sensor signal. For interferometric applications with a large dynamic range required for demodulation, such as OBS where the strong first brake from the gun array and weak reflections from the ground layers are both demodulated, conventional demodulation techniques may suggest a relatively large bandwidth to demodulate the fringe signal, even though the bandwidth of the sensor signal may be orders of magnitude lower. Thus, conventional demodulation techniques may require considerable computation resources and may even be impossible to implement for some signal processing systems.

One solution to the problem of processing interferometric signals having high fringe rates is described in U.S. Pat. No. 6,606,186 to Maas, entitled "Dynamic Fiber Optic Sensor Signal Processing Scheme," filed Jul. 25, 2001. In an effort to optimize bandwidth utilization of demodulators in a system for seismic signal processing, Mass teaches the use of two demodulators, wherein the bandwidth of one demodulator is greater than the bandwidth of the other demodulator, and an optical switch having a switch control input electronically coupled to the output of a fringe rate detector. The optical signals are switched among the demodulators depending on the fringe rates such that signals are only routed to the high performance demodulator (i.e., the demodulator with the higher bandwidth capable of processing signals having high fringe rates) when necessary.

In one aspect of the invention, optical signals are routed to a first demodulator, the fringe rate for each of the optical signals is sensed, and a signal line having fringe rates exceeding a threshold fringe rate is detected. The method further comprises rerouting the signal lines to a second demodulator, detecting a condition of the signal line, and rerouting the signal line from the second demodulator back to the first demodulator when the signal line has fringe rates below the threshold fringe rate input for the first demodulator. However, this technique requires a second high performance demodulator, an optical switch for routing signals between the two demodulators, and logic to control the optical switch.

Accordingly, there is a need for optical signal processing techniques, apparatus, and systems that effectively reduce the bandwidth of the fringe signal in interferometric sensors such that a large dynamic range in the demodulated sensor phase is achieved.

SUMMARY OF THE INVENTION

Embodiments of the present invention generally relate to optical signal processing methods, apparatus, and systems for interferometric sensors.

One embodiment of the present invention provides a method for detecting a sensor parameter dependent on an interferometer phase. The method generally includes transmitting a plurality of interrogation signals having different combinations of polarization states to a sensor interferometer; sampling interference signals received from the sensor interferometer in different polarization channels comprising interference between light components transmitted with the different combinations of polarization states to the sensor interferometer, wherein the sampling interval for the interference signals within each polarization channel is non-uniform with time; and extracting an estimate for the sensor parameter from the sampled interference signals.

Another embodiment of the present invention provides a method for detecting a sensor phase in an interferometric system. The method generally includes transmitting a plurality of optical signals to an optical sensor for a plurality of polarization channels, wherein a sequence of the optical signals for each polarization channel is non-uniform with time; detecting interference signals received from the optical sensor for each polarization channel; reconstructing fringe phasors, one for each polarization channel, based on the transmitted plurality of optical signals; performing adaptive mixing on the fringe phasors to yield mixed signal phasors for each polarization channel and a sensor phase estimate; filtering and decimating the mixed signal phasors and the sensor phase estimate; and extracting the sensor phase from the decimated mixed signal phasors and decimated sensor phase estimate.

Yet another embodiment of the present invention provides a method for interrogating an optical sensor. The method generally includes transmitting a sequence of optical signals to the optical sensor, wherein the sequence of optical signals is non-uniform with time, and sampling received signals from the optical sensor according to the transmitted sequence of optical signals.

Yet another embodiment of the present invention provides a method for detecting a sensor parameter dependent on an interferometer phase. The method generally includes transmitting interrogation signals to a sensor interferometer, sampling interference signals received from the sensor interferometer with a sampling interval that is non-uniform with time, and extracting an estimate for the sensor parameter from the sampled interference signals.

Yet another embodiment of the present invention provides an interferometric system. The interferometric system generally includes an optical sensor, a transmitter configured to transmit a sequence of optical signals to the optical sensor, wherein the sequence of optical signals is non-uniform with time, a receiver configured to detect interference signals produced by the optical sensor and the transmitted sequence of optical signals, and a signal processing unit configured to reconstruct the detected interference signals based on the transmitted non-uniform sequence of optical signals.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 7A-B are flow diagrams showing different methods of combining the sensor phase estimate and the mixed signal phasors from adaptive mixing to obtain the sensor phase in accordance with embodiments of the present invention.

DETAILED DESCRIPTION

Embodiments of the invention generally relate to optical signal processing methods, apparatus, and systems that effectively reduce the bandwidth of the fringe signal in interferometric sensors.

Ocean bottom seismic (OBS) sensing systems are described below as a particular, but not limiting, example of an application in which embodiments of the present invention may be used to advantage. However, those skilled in the art will recognize that the concepts described herein may be used to similar advantage in a wide variety of other applications in which a large number of optical sensors are interrogated.

Further, while embodiments of the present invention will be described with reference to optical fibers, those skilled in the art will recognize that any type of suitable optical waveguide may be used as well. Further, while embodiments of the present invention will be described with reference to sensor elements utilizing inline reflective elements such as fiber Bragg gratings (FBGs) to create interferometers, those skilled in the art will recognize that concepts described herein and recited in the claims may, in some cases, also be applied to interferometers utilizing transmissive elements (with analogies drawn between transmissive properties and reflective properties) and, more generally, to a wide variety of optical sensors.

Moreover, mixing is described below as a particular, but not limiting, example of frequency shifting which may be employed in the signal processing techniques of the present invention described herein. However, those skilled in the art will recognize that any type of frequency shifting for signal processing may be used to similar advantage.

An Exemplary Interferometer System

Figure 1:
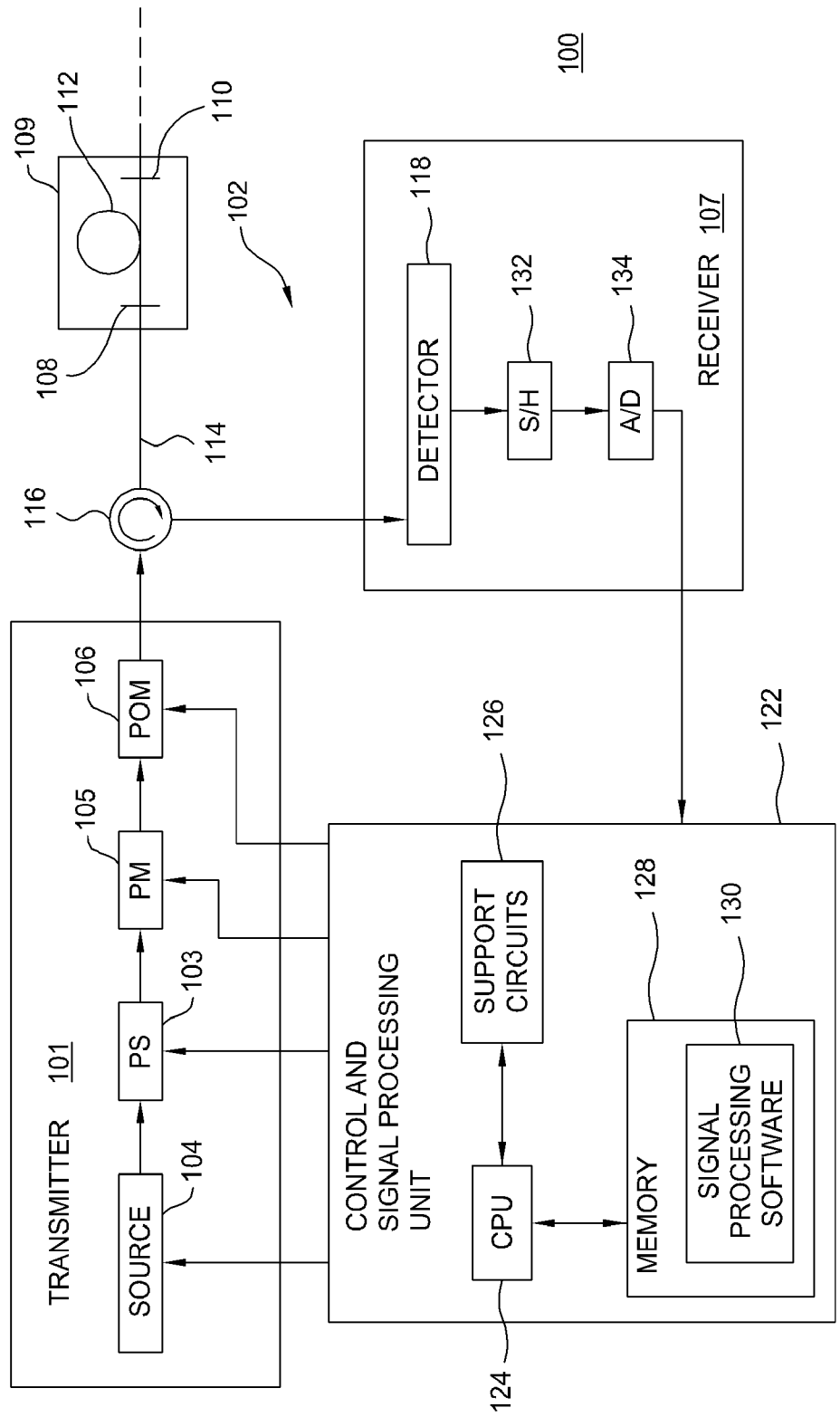
FIG. 1 is a block diagram of an optical interferometer system in accordance with an embodiment of the present invention.

FIG. 1 depicts an optical interferometer sensor system 100, which may be used to generate a fringe signal, as described in U.S. Pat. No. 7,081,959, entitled "Method and Apparatus for Providing Polarization Insensitive Signal Processing for Interferometric Sensors," commonly owned with the present application, herein incorporated by reference in its entirety. The optical interferometer sensor system 100 may comprise a transmitter 101, a receiver 107, an optical circulator 116, a sensor array 102, and a control and signal processing unit 122. The transmitter 101 may comprise a source 104, a pulse shaper 103, a phase modulator 105, and a polarization modulator 106. The pulse shaper 103 may comprise one or more Mach-Zehnder electro-optic modulators, acousto-optic modulators (Bragg cells), or the like to form optical pulses. The pulse shaper 103 may also comprise a compensating interferometer with an imbalance substantially equal to the sensor imbalance to clone one pulse into two pulses. The receiver 107 may comprise a detector 118, a sample-and-hold (S/H) circuit 132, and an analog-to-digital (A/D) converter 134. The source 104 may be a light source, such as a laser, and may be capable of producing light signals with multiple wavelengths.

While the interferometer sensor system 100 illustrated in FIG. 1 includes separate transmitter, receiver, and signal processing units, some embodiments may provide a unit for performing all or a combination of these functions. The light from the source 104 may be pulsed by pulse shaper 103, phase modulated by phase modulator 105, and have its polarization modulated by the polarization modulator 106 in an effort to form interrogation pulses that allow for interrogation that is insensitive to polarization-induced phase noise. Optical fibers (not shown) may be employed to couple the components of the transmitter 101 to one another, and preferably, these fibers should be polarization-maintaining fibers so that the polarization into the polarization modulator 106 does not vary. The modulated light produced by the transmitter 101 may be coupled to the sensor array 102 through the circulator 116.

The sensor array 102 may comprise one or more Fabry-Perot (FP) interferometers having a lead fiber optic cable 114, a reference reflector 108, at least one length of fiber optic cable 112, and at least one sensor reflector 110. A sensor 109 may be formed by a length of fiber between reflectors (e.g., fiber 112 between reflectors 108 and 110). The reflectors 108 and 110 may be fiber Bragg gratings (FBGs) that are formed along the fiber. The sensor 109 may be used to measure various properties which affect the length of fiber optic cable 112 by a measurable amount, such as changes in temperature, pressure, acceleration, and strain. The sensor array 102 may contain multiple sensors 109 that may be positioned along one or more parallel fibers that branch from the lead fiber 114, and each of these fibers may contain multiple sensors 109 in series.

Figure 2:
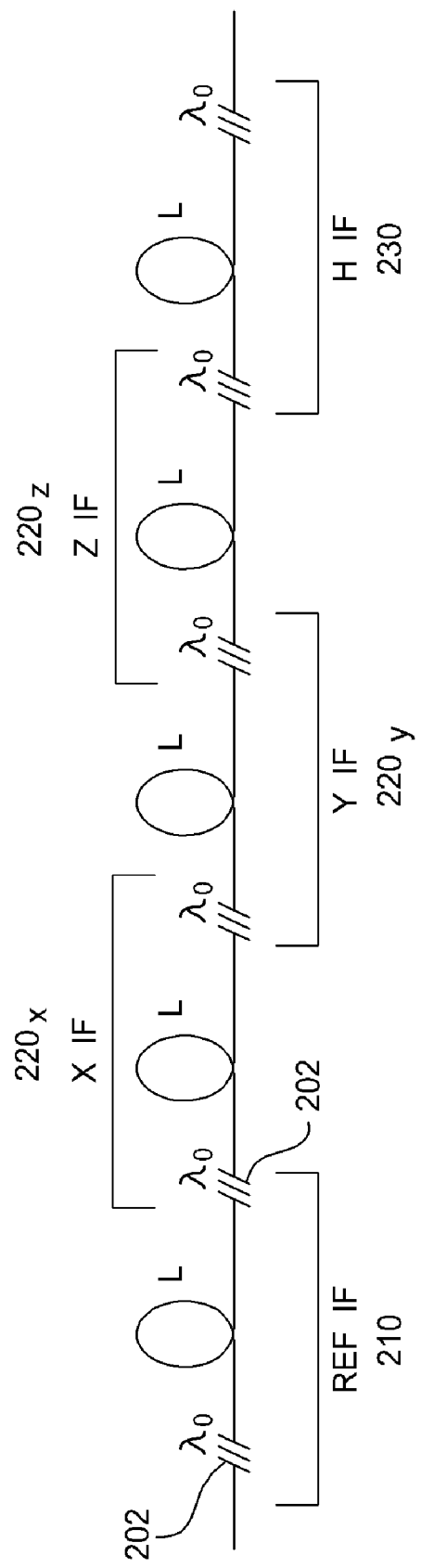
FIG. 2 illustrates a basic configuration of ocean bottom seismic (OBS) sensors in accordance with an embodiment of the present invention.

For example, FIG. 2 illustrates a basic configuration of multiple sensors 109 in a sensor station that may be used in ocean bottom seismic (OBS) sensing applications, for example, as described in U.S. patent application Ser. No. 11/381,880 filed May 5, 2006 (WEAT/0732), herein incorporated by reference in its entirety. In the illustrated arrangement, the housing (not shown) of the sensor station may contain a reference interferometer 210; orthogonal X, Y, and Z accelerometers 220 ($220_X$, $220_Y$, and $220_Z$, respectively); and a hydrophone 230. As described in the above-referenced application, the accelerometers 220 may be arranged in some type of liquid-filled compartment of the housing for dampening of mechanical resonances caused by mechanical disturbances and pressure fluctuations. The housing may also include a mechanism for transferring pressure variations between the surrounding environment and an inside of a second compartment containing the optical fiber coil of the hydrophone 230. The reference interferometer 210 may be used to compensate for interrogating laser frequency fluctuations or phase perturbations in a compensating interferometer or in the lead cable as described in the commonly-owned U.S. Pat. No. 7,245,382, filed Oct. 24, 2003 entitled "Downhole Optical Sensor System with Reference."

Each of the interferometric sensors 210, 220, 230 may be formed by a length of fiber (e.g., a coil such as the length of fiber optic cable 112) separating a pair of reflective elements, such as gratings 202 formed therein. For some embodiments, the gratings 202 may be fiber Bragg gratings (FBGs). The gratings may share a common wavelength ($\lambda_o$) and, thus, may be interrogated via time-division multiplexing (TDM). Further, the optical properties of the gratings, including the features of the reflective spectrum, may be controlled to reduce cross-talk between sensors within the same station, as well as sensors from other stations. For some embodiments, the gratings may be formed in the fiber section, with appropriate spacing prior to wrapping the coils. Forming the gratings in this manner may eliminate the need for splices between sensors, reducing loss, manufacturing time and, thus, overall cost.

While each sensor may be formed by two gratings, gratings may be shared between sensors, such that only M+1 gratings are required for M interferometric sensors. For example, in the illustrated arrangement, six gratings with overlapping channel (reflection) bands are used to form the five sensors shown.

Any change in the optical path lengths between the fiber Bragg gratings, as will typically result from external influences on the accelerometer or hydrophone fiber coils, will alter the resulting superposed reflected signal from such a seismic sensor station. U.S. Published Patent Application No. 2005/0097955, entitled "Highly Sensitive Accelerometer," describes examples of interferometric accelerometers for determining acceleration and methods of fabricating such accelerometers. Therein, the accelerometers are based on a rigid frame, a mass movably suspended on the rigid frame and a sensing coil partially wrapped around surfaces of first and second elements to detect movement of the mass in response to an acceleration based on a change in length of the sensing coil.

Referring back to FIG. 1, other types of interferometers may function in the context of the present invention including Michelson interferometers, Mach-Zehnder (MZ) interferometers, and the like. No matter the type of interferometer, the amplitude of the reflected interference signal at detector 118 may vary according to the phase difference between the light that has propagated the sensor path (e.g., lead fiber 114, fiber 112, and sensor reflector 110) and the light that has propagated the reference path (in the FP interferometer, the reference arm comprises lead fiber 114 and reference reflector 108). The phase difference between the sensor and the reference path may be made sensitive to a physical measurand such as acceleration and pressure. In other embodiments, the interferometer may contain two sensor paths, where both paths are sensitive to a measurand, but typically with opposite sign. The circulator 116 may channel light reflected from the sensor array 102 to the detector 118. For some embodiments, a directional coupler may be utilized as an alternative for this purpose. The analog output of the detector 118 may be sampled and held by the S/H circuit 132 so that the A/D converter 134 can digitize a stable signal during its sampling period rather than a highly dynamic signal. The interference signal of combined light components received from both reflectors 108, 110 may be measured, and changes in the pattern may indicate a relative physical disturbance of the sensor.

The source 104, the pulse shaper 103, the phase modulator 105, and the polarization modulator 106 may be controlled by the control and signal processing unit 122. The control and signal processing unit 122 may comprise a central processing unit (CPU) 124, support circuits 126, and memory 128. The CPU 124 may be any processing unit that is capable of signal processing as well as controlling system functionality. Although a single CPU 124 is shown and discussed herein, those skilled in the art will realize that multiple processing units may be used wherein one processing unit may be used for controlling the components of the transmitter 101 and another processor may be used for signal processing, for example. The support circuits 126 may comprise well-known circuits, such as cache, power supplies, timing circuitry, input/output circuits, and the like. The memory 128 may comprise one or more of random access memory (RAM), read-only memory (ROM), removable storage, disk drive storage, and the like. The memory 128 may store signal processing software 130 that facilitates computing the sensor phase of the reflected signals from the sensor array 102.

Field programmable gate arrays (FPGAs) or application specific integrated circuits (ASICs) may also be incorporated, containing logical circuits which can be configured to perform computational and memory functions in highly efficient and dedicated ways. The control and signal processing unit 122 may then output or display the computed sensor phase on any suitable input/output (I/O) device (not shown), such as a serial or parallel interface, a printer, a cathode ray tube (CRT) monitor, a liquid crystal display (LCD) monitor, a light-emitting diode (LED) monitor, and the like.

The optical interferometer sensor system 100 may use time-division multiplexing (TDM) to form the interrogation signal by controlling the source 104, the pulse shaper 103, the phase modulator 105, and the polarization modulator 106. The pulse shaper 103 may produce a pair of pulses with a separation equal to the sensor imbalance within each TDM repetition period. The phase modulator 105 and polarization modulator 534 may modulate the phase difference between pulses in interrogating pulse pairs with a subcarrier frequency $f_{sc}$, that will result in subcarrier modulation of the interference signals reflected from the sensors allowing for sensor phase demodulation without ambiguity, and to perform polarization conditioning for polarization insensitive sensor interrogation, for example, in accordance with commonly owned U.S. Pat. No. 7,088,878, entitled "Method and Apparatus for Producing Depolarized Light," and U.S. Pat. No.7,081,959, entitled "Method and Apparatus for Providing Polarization Insensitive Signal Processing for Interferometric Sensors." In addition, the common phase or frequency of interrogating pulse pairs may be modulated to reduce cross-talk and noise caused by unwanted reflections in the system, according to the commonly owned U.S. patent application Ser. No. 11/056,970, entitled "Method and Apparatus for Suppression of Cross-Talk and Noise in Time-Division Multiplexed Interferometric Systems," all of which are herein incorporated by reference in their entirety.

The sensor(s) 109 may reflect the interrogation signal, reflections from the sensor(s) 109 may then be detected and converted to analog electrical signals by the detector 118, and the analog electrical signals may be converted to digital signals for signal processing, such as demodulation, by the S/H circuit 132 and the A/D converter 134. In certain interferometric sensor applications, such as OBS sensing, a large dynamic range may be required to demodulate the first brake (the direct signal from the source 104, a gun array for some embodiments, which is typically a strong signal) and weak reflections from the layers in the ground.

Figure 3A:
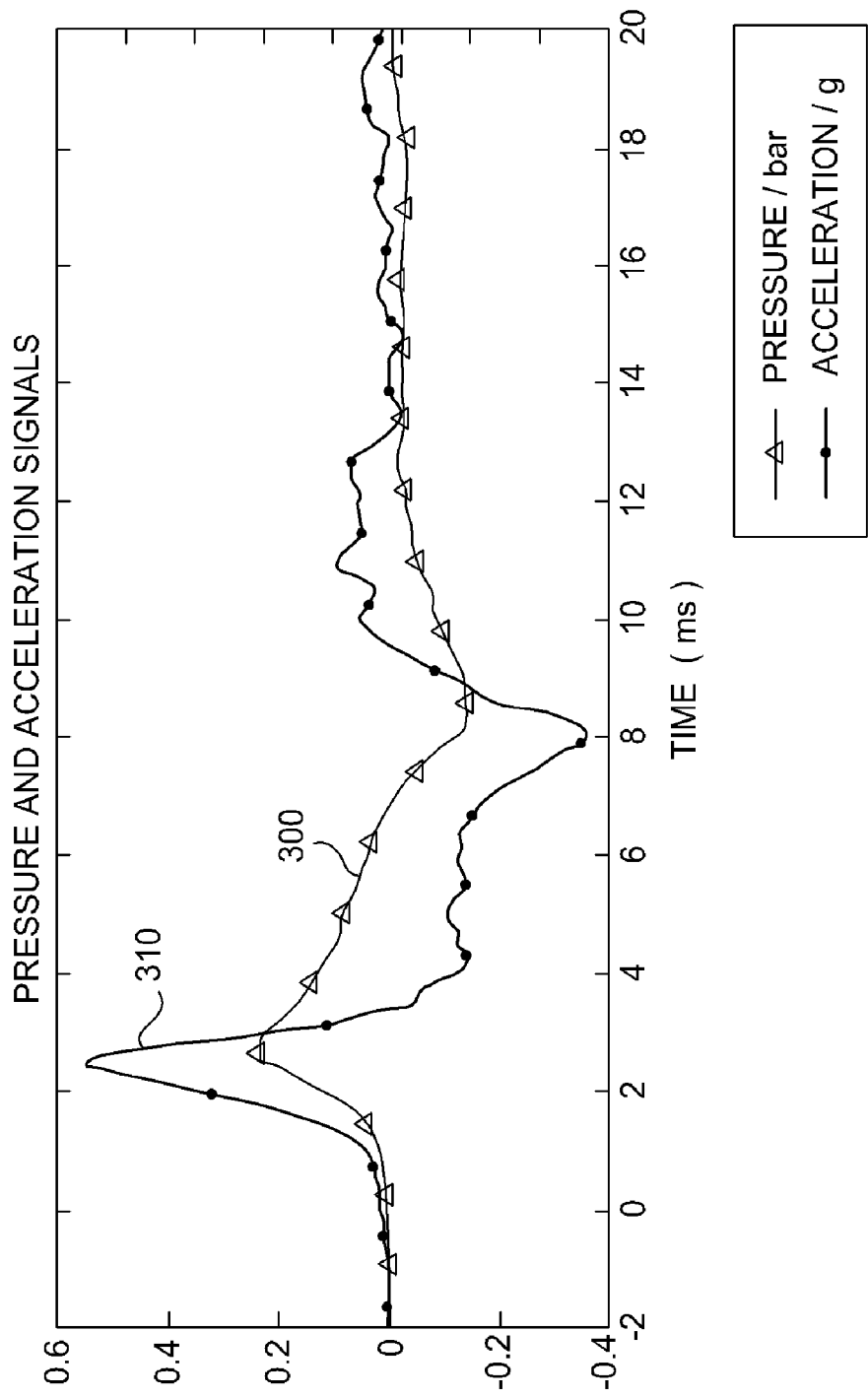
FIGS. 3A-D are graphs of converted sensor phase, sensor phase, fringe rate, and spectral density, respectively, for pressure and acceleration measurements of a first brake in an OBS application in accordance with embodiments of the present invention.
Figure 3B:
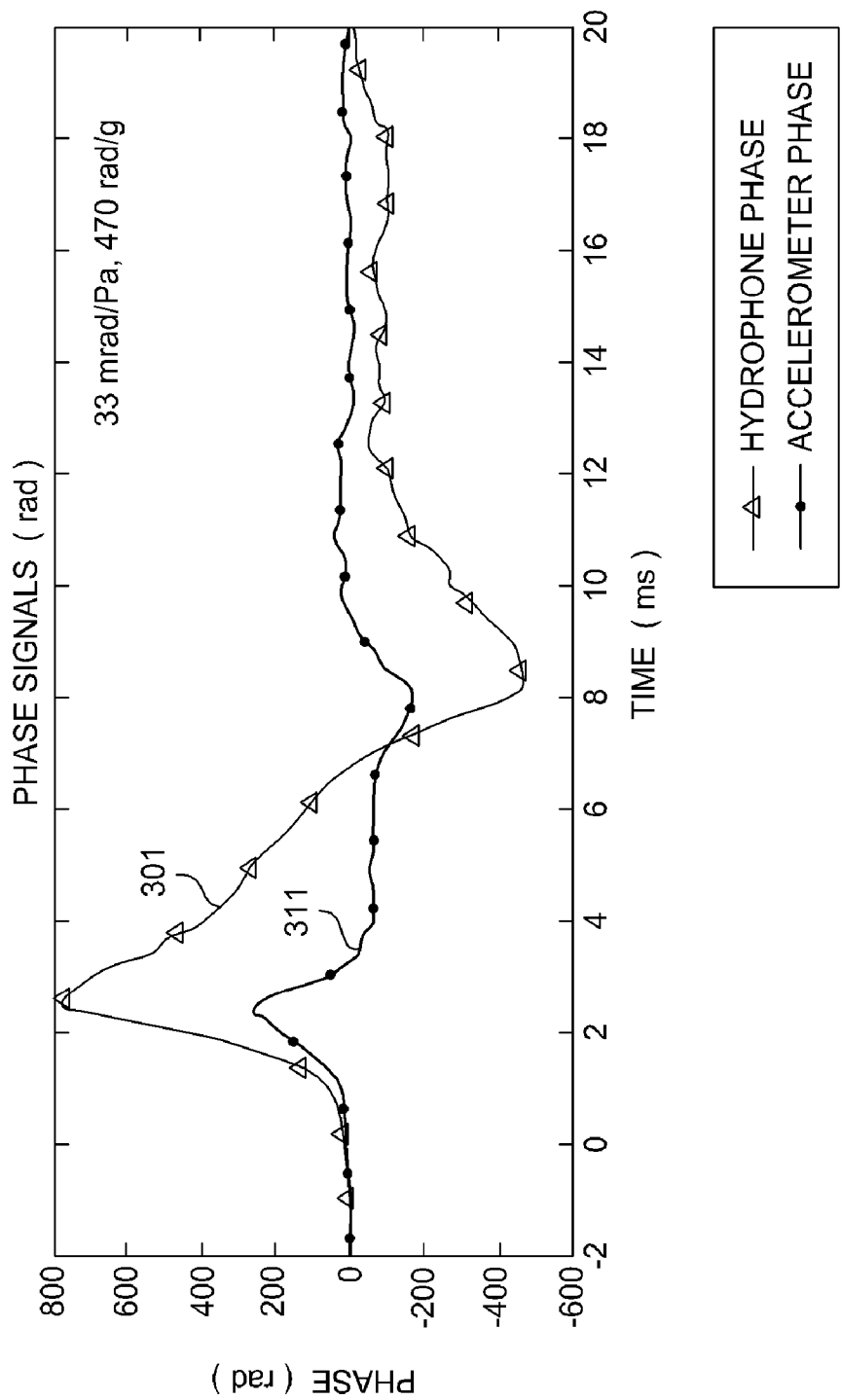

FIGS. 3A and 3B illustrate a typical OBS pressure signal 300 in bars over time in milliseconds (ms) of the first brake, which may be measured by reflected signals from the hydrophone 230, and corresponding hydrophone sensor phase 301 in radians (rad), respectively, with a conversion of 33 mrad/Pa. A typical accelerometer signal 310 per g over time in ms of the same first brake, which may be measured by reflected signals from the accelerometer 220, and corresponding accelerometer sensor phase 311 in rad, respectively, with a conversion of 470 rad/g, is also depicted.

Figure 3C:
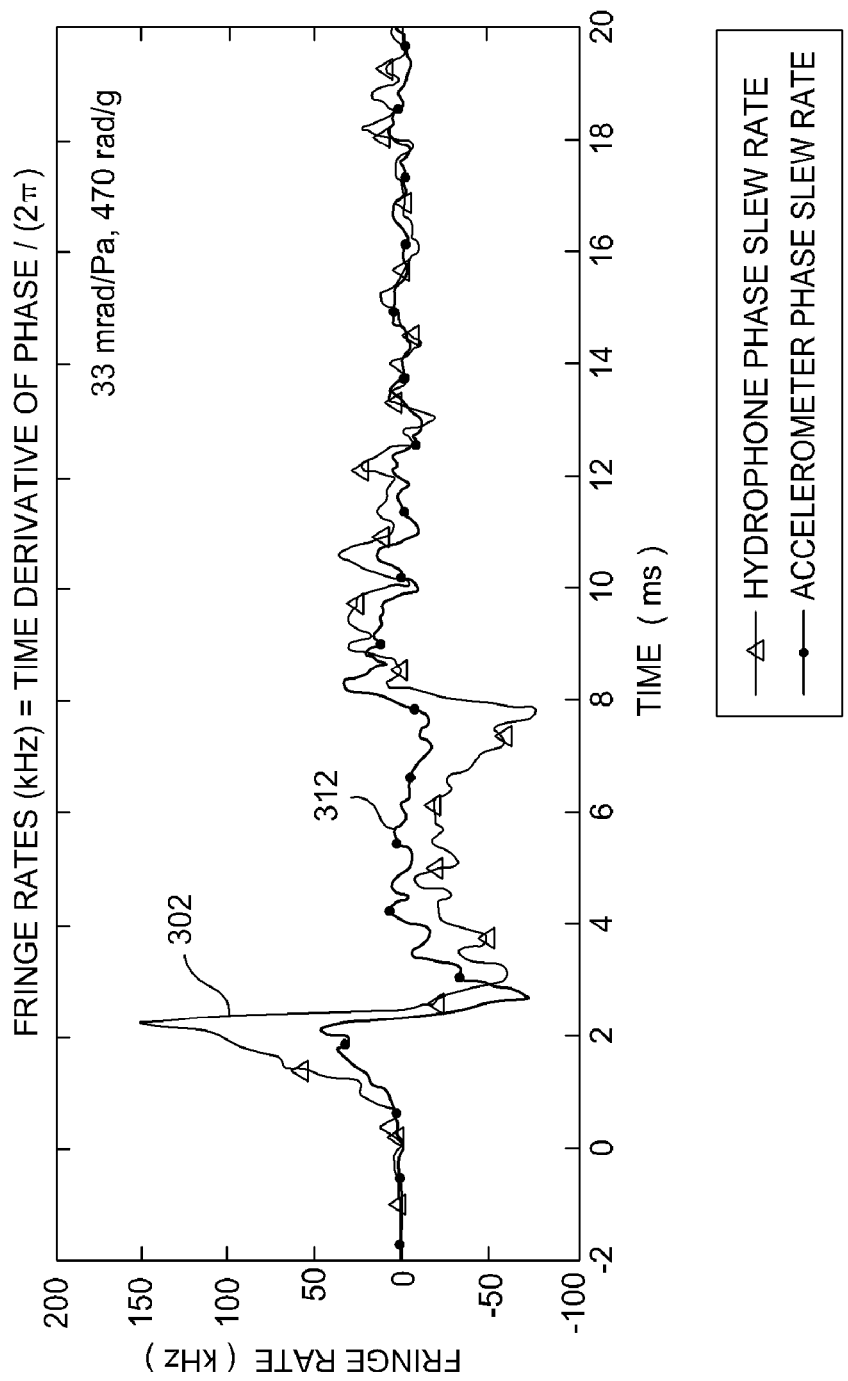

By taking the derivative of the pressure and accelerometer signals 300 and 310 divided by $2\pi$, the fringe rate (the signal speed for the rate of change of the sensor phase, also called the slew rate) for pressure (the hydrophone fringe rate 302) and acceleration (the accelerometer fringe rate 312) over time may be determined as illustrated in the graph of FIG. 3C. The hydrophone fringe rate 302 may exceed 220 kHz peak-to-peak, and the accelerometer fringe rate 312 may exceed 110 kHz peak-to-peak as shown.

Figure 3D:
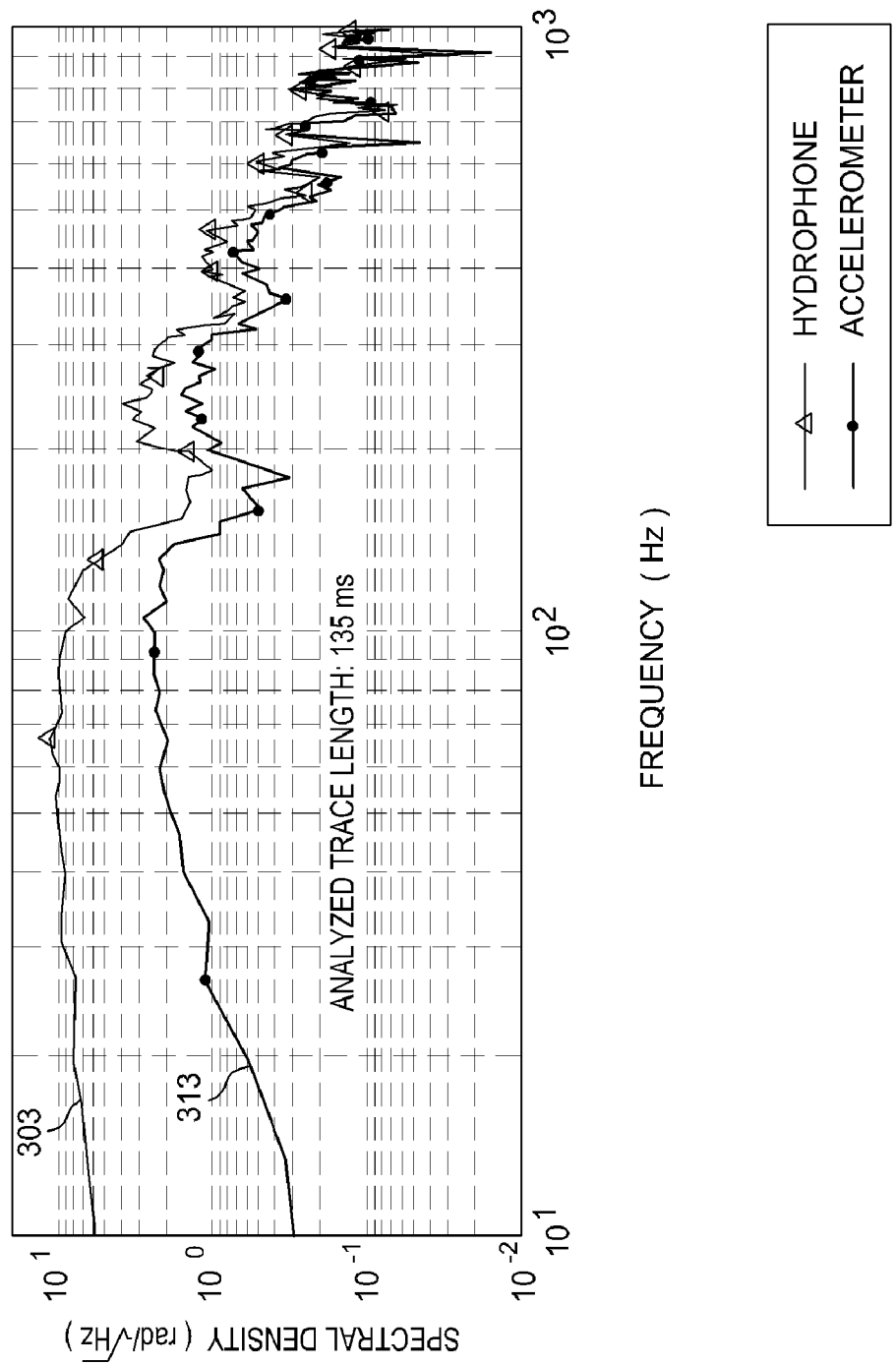

FIG. 3D illustrates the hydrophone spectral density 303 and the accelerometer spectral density 313 corresponding to the hydrophone fringe rate 302 and the accelerometer fringe rate 313, respectively, showing that the bandwidth of the sensor signal is typically about 1 kHz. Even though the bandwidth of the sensor signal may be less than 1 kHz, the bandwidth of the fringe signal may be as large as 110 or even 220 kHz. At shallower waters or with larger seismic sources, the bandwidths may be even larger. The bandwidth of the fringe signal is therefore determined by the slew rate and not the bandwidth of the sensor signal.

Figure 4A:
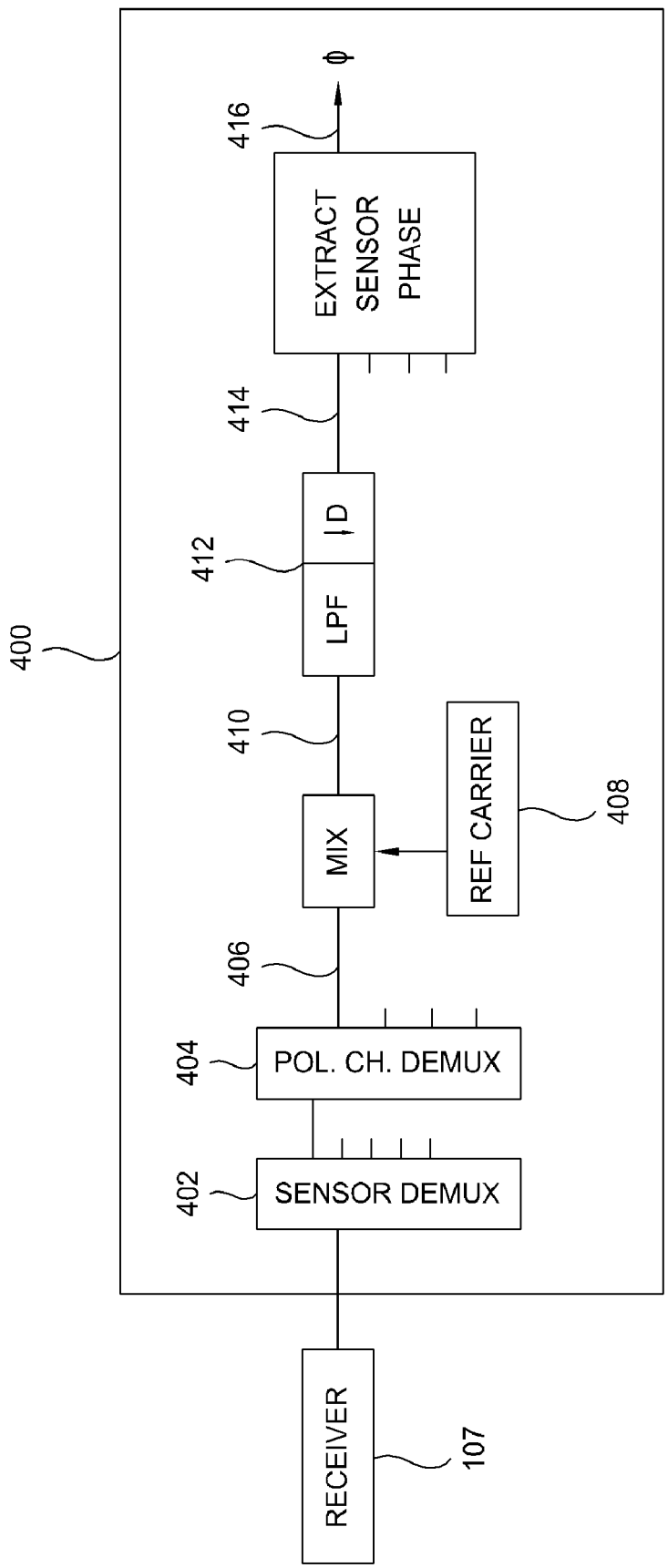
FIG. 4A illustrates a method of mixing a polarization channel of a sensor with a constant local oscillator frequency to determine the sensor phase in accordance with the prior art.

With conventional demodulation techniques, the demodulator would operate with at least twice the peak-to-peak fringe rate and, as illustrated in FIG. 4A, this would suggest operating the demodulator at 250 or even 500 kHz, thereby consuming considerable computational resources. In FIG. 4A, the receiver 107 receives the reflected interferometric signals from the one or more sensors, such as the accelerometers 220 or hydrophone 230, each sampled at a sampling frequency ($f_s$) equal to the repetition rate of the interrogation pulses and converts them to digital signals to be processed by the demodulator 400, which may be part of the control and signal processing unit 122. The demodulator 400 may separate the received signals by sensor in the sensor demultiplexer (demux) 402 (five different sensor signals are shown) and by polarization channel in the polarization channel demux 404 (four different polarization channels are shown, which will be described below with respect to FIG. 8A).

As used herein, a polarization channel generally refers to the transmitted and/or the corresponding received light components having a certain combination of polarization states. For example, consider two polarization states: x and y. A polarization channel may be composed of all of the received light components having polarization state x. As another example when transmitting pulse pairs (i.e., two optical pulses having the same or different polarization states), a polarization channel xy may include all of the received light components originating from interference between the pulses of transmitted pulses pairs with the first pulse having polarization state x and the second pulse having polarization state y.

A given polarization channel signal 406, with a clock rate of $f_s/4$, may be mixed with a reference carrier 408 at the subcarrier frequency ($f_{sc}$), for example. The sub-carrier frequency $f_{sc}$ is typically $f_s/16$, which is half the Nyquist frequency for a polarization channel, so that the sensor signal is centered halfway between 0 and the Nyquist frequency. The resulting mixed signal 410 may be low pass filtered and decimated in one or more digital low pass/decimation filters 412, and the sensor phase 416 may be extracted by combining the result 414 with similar results obtained from mixing the other polarization channel signals with the same reference carrier and low-pass filtering and decimating them. Possible crosstalk due to multiple reflections in other sensors may be removed by using an inverse scattering algorithm, such as layer-peeling that takes into account the mixed, decimated and low-pass filtered signals from the other sensors. Suitable layer-peeling algorithms are described in detail in the commonly owned U.S. Pat. No. 7,019,837, entitled "Method and Apparatus for Reducing Cross-Talk Interference in an Inline Fabry-Perot Sensor Array," herein incorporated by reference.

An Exemplary Method of Adaptive Mixing

Figure 4B:
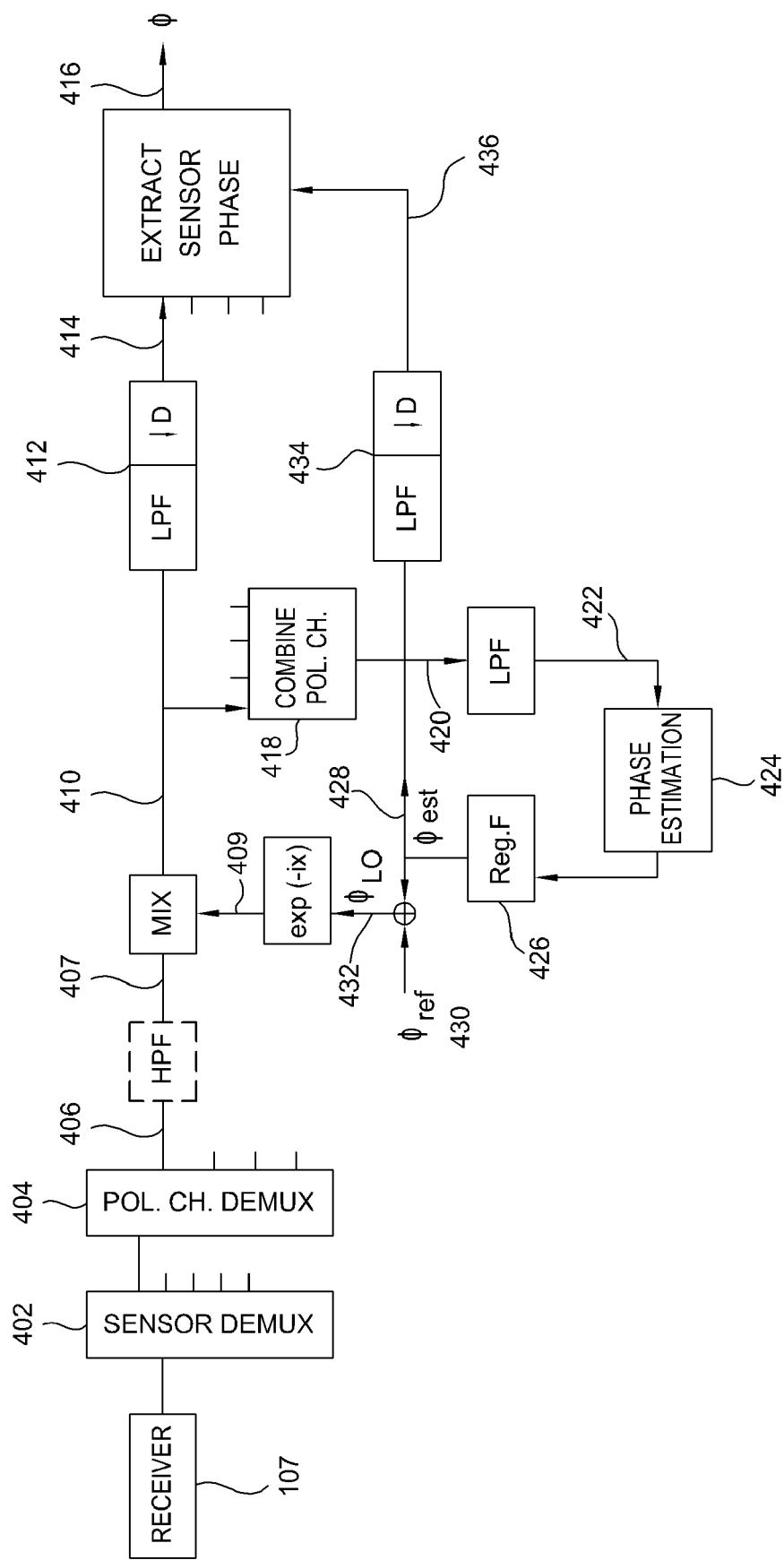
FIGS. 4B-C illustrate two different methods of adaptive mixing in accordance with embodiments of the present invention.
Figure 5A:
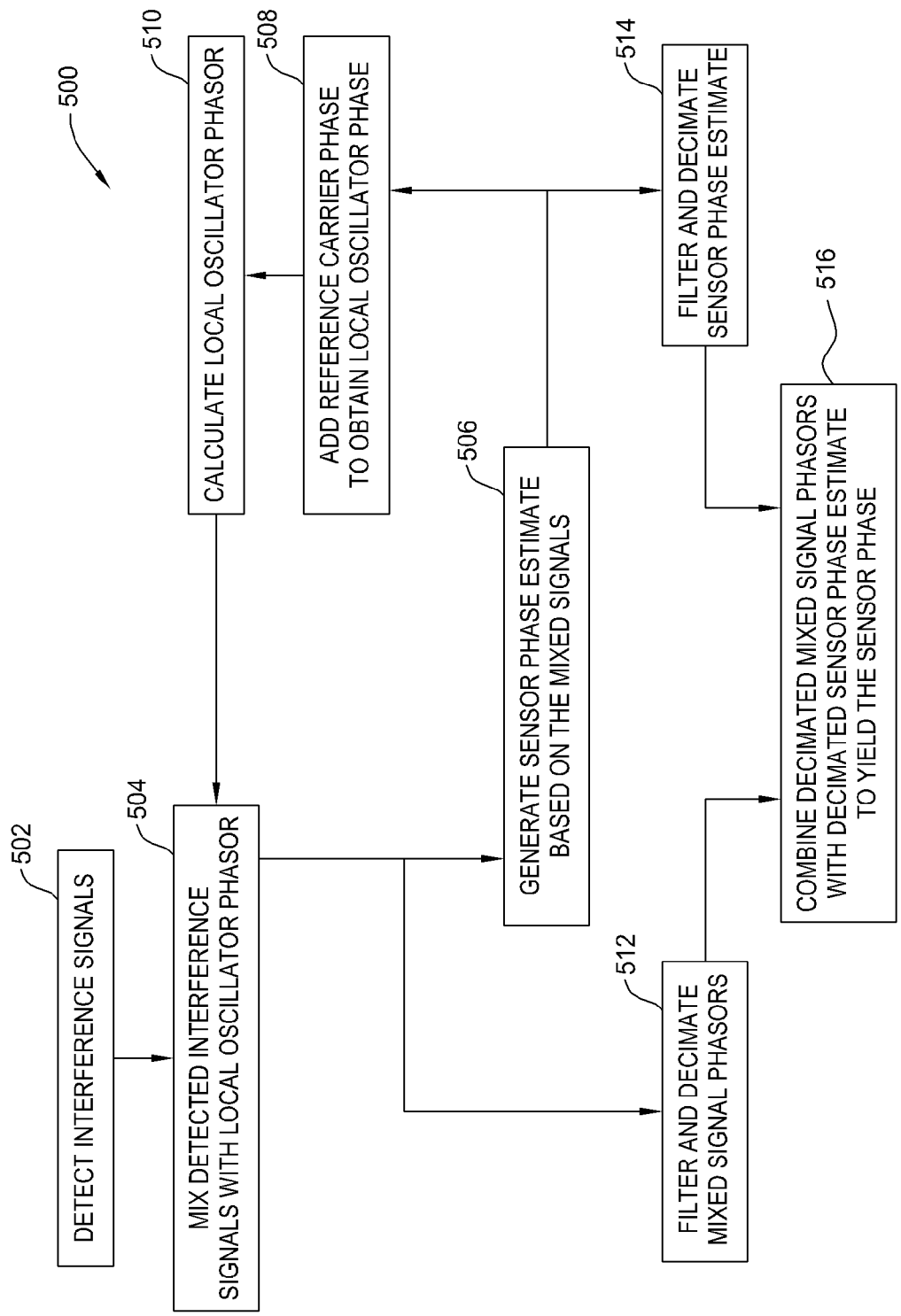
FIGS. 5A-B are flow diagrams for the methods of adaptive mixing in FIGS. 4B-C, respectively, in accordance with embodiments of the present invention.

In an effort to significantly reduce the bandwidth requirements for sensing high slew rate fringe signals and hence, the computational resources, the demodulator 400 may employ the techniques of adaptive mixing as illustrated in the block diagram of FIG. 4B and the flow diagram 500 of FIG. 5A. Rather than using a constant local oscillator frequency, such as the reference carrier, the concept of adaptive mixing for some embodiments is to estimate the sensor phase early in the demodulation process, calculate a rotation phasor (known as the local oscillator) based on the sensor phase estimate, and mix the local oscillator with the fringe signal. In this manner, the bandwidth of the fringe signal for a given sensor, as well as the demands on computational resource allocation of the interferometer system 100, may be significantly reduced.

In step 502, the receiver 107 may detect the reflected interferometric signals from the interferometric sensor(s) sampled at the sampling frequency ($f_s$) and may convert them to digital signals to be processed by the control and signal processing unit 122, for example. The received signals may be separated according to the associated sensor by the sensor demux 402 and according to the polarization channel by the polarization channel demux 404. The polarization channel signal 406 may be passed through an optional high pass filter (HPF), such as an infinite impulse response (IIR) filter, in an effort to remove DC components from the signal 406.

The high-pass filtered signal 407 (or the polarization channel signal 406) may be mixed with a local oscillator phasor 409 in step 504 to generate a mixed signal 410. The local oscillator phasor 409 may be calculated in an adaptive mixing feedback loop based on one numerical oscillator for each sensor that is configured to follow the sensor fringe frequency. The mixed signals 410 from each of the polarization channels may be combined in a suitable manner, such as by a weighted average operation, in the polarization channel combiner 418 in an effort to provide a combined phasor 420. For some embodiments, each polarization channel may have its own adaptive mixing loop, and the mixed signals from each polarization channel may not be combined, although such embodiments may require more memory and require more computation. Such embodiments may also suffer from problems due to low fringe amplitudes in individual polarization channels, such that a phase estimate cannot be obtained. The combined phasor 420 may be digitally low-pass filtered, such as by an IIR pre-filter, to provide the feedback input phasor 422 for the phase locked oscillator.

In step 506, the phase of the feedback input phasor 422 may be estimated using any suitable method, such as a four quadrant phase extraction function with phase unwrapping between subsequent samples to remove $2\pi$ steps, in the phase estimation block 424. The output of the phase estimation block 424 may be filtered (e.g., by a regulator filter 426 with an integrator function) to generate the sensor phase estimate ($\phi_{est}$) 428. The reference carrier phase ($\phi_{ref}$) 430 may be added to the sensor phase estimate in step 508 to calculate the local oscillator phase ($\phi_{LO}$) 432. In step 510, the local oscillator phase 432 may be converted to a local oscillator phasor 409 for mixing with the detected fringe frequency to complete the adaptive mixing loop.

For some embodiments, a fringe frequency estimate defined as the derivative of the sensor phase estimate 428 divided by $2\pi$ and a local oscillator frequency as the derivative of the local oscillator phase 432 divided by $2\pi$, may be calculated instead of the sensor phase estimate 428 and the local oscillator phase 432. Those skilled in the art would realize that defining adaptive mixing in terms of frequency or phase yields corresponding results. Both the phase and frequency of the mixed signal are parameters dependent on the phase of the mixed signal.

In yet another embodiment, the local oscillator phasor 409 may be calculated by multiplying together a phasor $\exp[i\phi_{est}]$ calculated from the sensor phase estimate 428 and a phasor $\exp[i\phi_{ref}]$ calculated from the reference carrier phase 430. For this embodiment, no explicit calculation of the local oscillator phase 432 is required.

The mixed signal 410, having a fringe frequency determined by the difference between the detected fringe frequency and the local oscillator frequency, may be low pass filtered and decimated by a factor D in one or more digital low pass/decimation filters 412 in step 512. FIG. 3D shows that the sensor phase has a much lower bandwidth than the fringe signal. Thus, the sensor phase estimate 428 may also be low pass filtered and decimated by the same factor D in one more digital low pass decimation filters 434 similar to decimation filters 412 in step 514. The decimation filters 412 and 434 are typically designed such that the signal energy above the Nyquist frequency of the decimated output is essentially removed. In this way, the sensor signal may be decimated without compromising the signal to noise ratio. In step 516, the sensor phase 416 may be extracted from the decimated mixed signal result 414 and the decimated sensor phase estimate 436 at this reduced sampling rate for a high resolution output signal with increased dynamic range when compared to conventional demodulation techniques, such as those illustrated in FIG. 4A.

The adaptive mixing loop may be designed to stabilize the frequency of the combined phasor 420 and may be implemented such that an error phase amounting to several multiples of $2\pi$ can be handled. In addition, the adaptive mixing loop should ideally never lose track of the input fringe frequency, implying that the feedback gain-bandwidth product should be designed to be as high as possible. Furthermore, the mixed signal 410 at the output of the mixer may be designed to contain most of its essential information within the passband of the decimation filters 412, 434 (e.g., ±3 kHz). This means that the estimated fringe frequency cannot deviate by more than the bandwidth of the decimation filters from the actual fringe frequency. However, the sensor phase estimate 428 may be allowed to deviate significantly from the actual sensor phase 416 at low frequencies (even several times $2\pi$), as long as the deviation in fringe frequency does not become too large. This reduced bandwidth signal may be processed with moderate processing power requirements, significantly lower than the processing power required by conventional demodulation techniques described above.

The fringe signal is a real signal having a Fourier representation that includes a DC-component, a component at the positive fringe frequency, and a component at the negative fringe frequency. However, only the positive fringe frequency is generally of interest. With conventional demodulation techniques, this problem is solved by extracting the signal band around a subcarrier that is applied to the interrogation signal to shift the fringe signal in frequency. In certain interferometer applications, such as OBS sensing, the sensor signal may be so large that the center of the band designated for extraction is shifted away from the subcarrier frequency.

With the adaptive mixing techniques according to embodiments of the invention described above, the feedback loop may solve the problem. Therein, the output from the mixer may be low pass filtered to extract the signal around DC, and the sensor phase estimate is calculated from this signal. As long as the feedback loop is locked to the positive fringe frequency component, the signal around DC after mixing is the positive fringe frequency component shifted in frequency. However, when the fringe frequency approaches 0 or the Nyquist frequency, the positive and negative frequency components may overlap, the feedback loop may start to lock on the negative fringe frequency component, and the feedback loop may become unstable.

Significant advantages may also be achieved for some embodiments by filtering the fringe data with a suitable filter, such as a Hilbert transform acting in place of or in series with the optional high pass filter shown in FIG. 4B, in an effort to remove negative frequency components from the data before the polarization channel signals 406 are sent to the mixer and thereby improve the stability of the feedback loop. However, a filter with reasonably narrow transition regions would have a long impulse response and most likely consume significant computation resources.

Figure 6A:
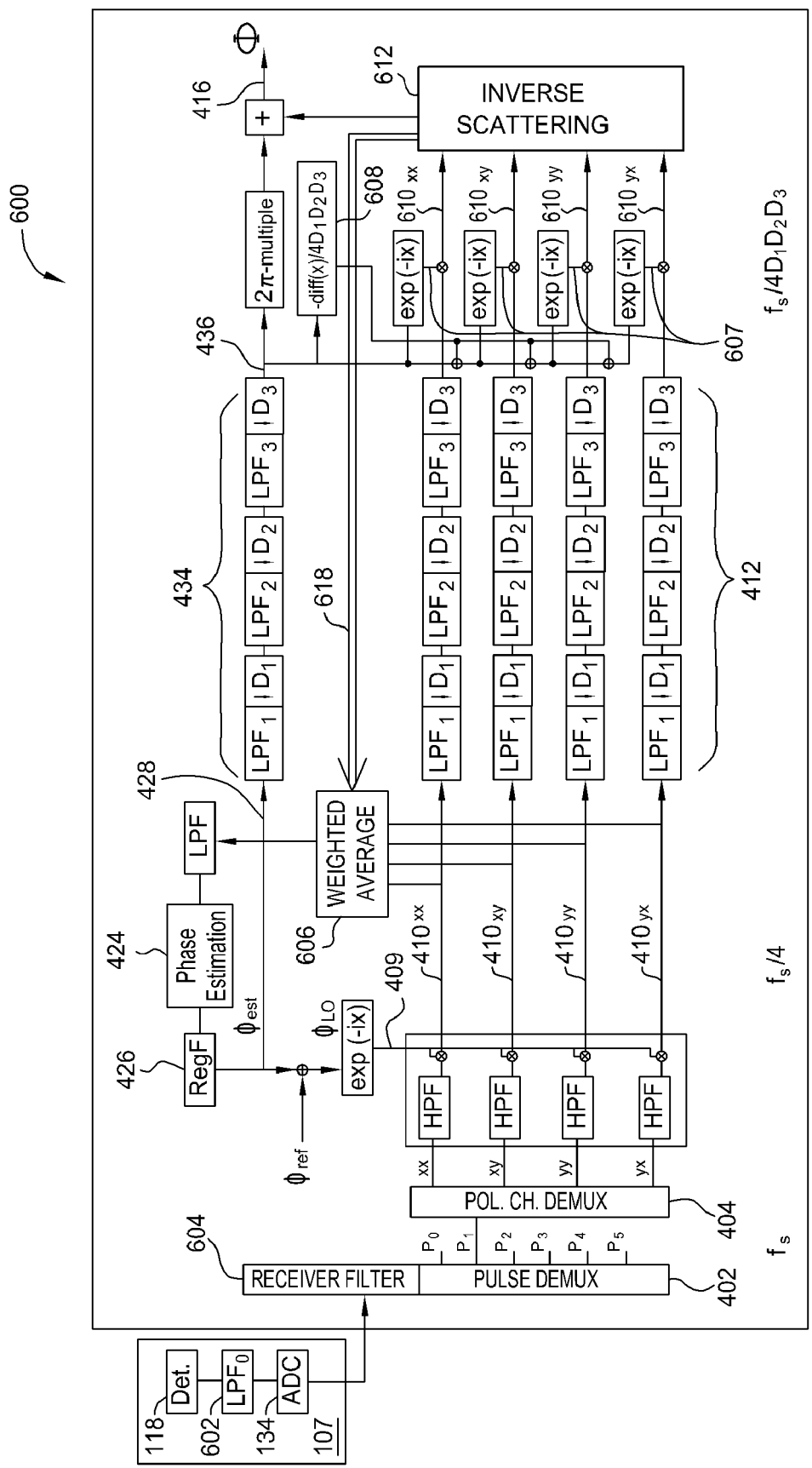
FIGS. 6A-B illustrate implementations of adaptive mixing for interferometric systems in accordance with embodiments of the present invention.

FIG. 6A is a block diagram 600 illustrating an implementation of adaptive mixing with the feedback technique as described above for four polarization channels (e.g., pulse pairs xx, xy, yy, and yx). The receiver 107 may comprise a detector 118, an anti-aliasing filter 602, an A/D converter 134, and a sample/hold circuit 132 (which may be integrated into the A/D converter 134). The sampling frequency of the A/D converter 134 may depend on a number of factors including the Nyquist criterion for sampling the polarization channels, the number of polarization channels per sensor, and the number of sensors being sampled by a single A/D converter.

The digitized output of the A/D converter 134 may be coupled to a digital receiver filter 604, which may apply a sampling impulse response before extracting the peak amplitudes of the detected and filtered interference pulses at appropriate times in an effort to produce a number (e.g., six are shown, one for each sensor) of output pulse samples with clock rate $f_s$. The impulse response length of the digital receiver filter 604 may be between 30 and 40 samples, for example. The pulse samples may be distributed to the different sensor processing channels by the sensor demux 402, which may be integrated with the receiver filter 604 as depicted. Only one of the sensor processing channels is illustrated in FIG. 6A. Other sensor processing channels may have similar parallel implementations.

FIG. 6A also illustrates the four sampled, high-pass filtered fringe signals for each polarization channel being mixed with the local oscillator phasor 409 and input to a weighted averager 606 for sensor phase estimation according to the adaptive mixing technique with feedback. The coefficients for the weighted averager 606 may be uploaded for initiation of the adaptive mixing loop.

In FIG. 6A, the mixed signals $410_{xx}$, $410_{xy}$, $410_{yy}$, $410_{yx}$ are low-pass filtered and decimated by three low-pass filter/decimation stages 412, which may have the same or different decimation factors $D_1$, $D_2$, and $D_3$. Although a single decimation stage with a decimation factor $D_1 D_2 D_3$ could be used, the computation resources allocated in order to achieve the same filter performance may be significantly reduced by using multiple decimation stages as illustrated. The sensor phase estimate 428 may be filtered and decimated by a similar implementation 434 of the three low-pass filter/decimation stages. The decimation stages may be linear phase finite impulse response (FIR) low pass filters, where the operation of the low pass filtering and the decimation stage may be described mathematically as $$y_j(m) = \sum_{n=1}^{N_j} x_j(D_j m - n) h_j(n) \tag{1}$$

where $N_j$ is the number of filter coefficients, $h_j$ is the filter coefficient set, $x_j$ is the input signal, $D_j$ is the decimation factor, and $y_j$ is the decimated output signal. The input and output signals $x_j$ and $y_j$ may be complex in the mixed signal stages 412, but may be real in the estimated sensor phase stages 434. After decimation, the effective sample rate may be $f_s/(4 D_1 D_2 D_3)$ for all five channels.

For some embodiments, combining the decimated sensor phase estimate ($\phi_{est,d}$) 436 and the phase extracted from the decimated mixed signal phasors 414 in step 516 may be done directly as shown in the flow diagram 700 of FIG. 7A. In step 702, the decimated mixed signal phasors 414 may be combined to construct a sensor Jones matrix indicating the difference between the two optical propagation paths through the demodulated sensor as described in detail in the commonly owned U.S. Pat. No. 7,081,959, entitled "Method and Apparatus for Providing Polarization Insensitive Signal Processing for Interferometric Sensors," herein incorporated by reference. The determinant (D) of the sensor Jones matrix may be calculated in step 704, where the determinant is equal to the decimated sample of polarization channel xx multiplied with the decimated sample of polarization channel yy minus the decimated samples of polarization channels xy and yx multiplied together (i.e., $D=S_{xx,d}S_{yy,d}-S_{xy,d}S_{yx,d}$). In step 706 the phase of the determinant may be calculated, and then the sensor phase estimate 428 may be added to the phase of the determinant to obtain the sensor phase ($\Phi$) 416 in step 708.

For other embodiments as shown in FIG. 6A, the decimated sensor phase estimate ($\phi_{est,d}$) 436 and the decimated mixed signal phasors 414 may be combined in step 516 according to the flow diagram 710 of FIG. 7B. In step 712, an estimated sensor phasor 607 may be calculated from $\phi_{est,d}$ 436. The estimated sensor phasor 607 may be mixed with each decimated mixed signal phasor 414 in step 714. Since the polarization channels pulse pairs are measured at different points in time according to the TDM interrogation interval, the delay difference between the polarization channels may need to be corrected. The diff(x)/4$D_1D_2D_3$ function 608 may interpolate the decimated sensor phase estimate $\phi_{est,d}$ 436 in an effort to remove this delay difference from each of the polarization channels.

The corrected polarization channels 610 may be combined in step 716 to construct a sensor Jones matrix, and in step 718, inverse scattering may be applied on the set of Jones matrices for different sensors in an inverse scattering function 612 as depicted in FIG. 6A. The determinant ($D=S_{xx,d}S_{yy,d}-S_{xy,d}S_{yx,d}$ as described above) of the sensor Jones matrix may be calculated in step 720, and the phase of the determinant may be calculated and divided by two in step 722. This phase may have a range $[-\pi/2, \pi/2]$. To expand this range to $[-\pi, \pi]$, the phase of the individual polarization channels may be calculated and compared with the phase calculated from the determinant in order to determine whether $\pi$ should be added to the determinant phase. The resulting phase represents the deviation of the sensor phase from a $2\pi$ multiple of the sensor phase estimate. Furthermore, because only the sensor phase modulus $2\pi$ is added by the mixer, $2\pi$ multiples of the sensor phase estimate 428 may be added to the phase of the determinant to yield the sensor phase ($\Phi$) 416 in step 724.

For many embodiments, the sensor phase estimate ($\phi_{est}$) 428 may have a large offset from the actual sensor phase that can vary relatively slowly with time, and the local oscillator phase ($\phi_{LO}$) 432 may have a large, but slowly varying offset from the phase of the detected interference fringes. Such slowly varying phase offsets may be allowed as long as the bandwidth of the mixed signal does not exceed the bandwidth capacity of the processing channel that analyzes the output from the mixer.

Figure 6B:
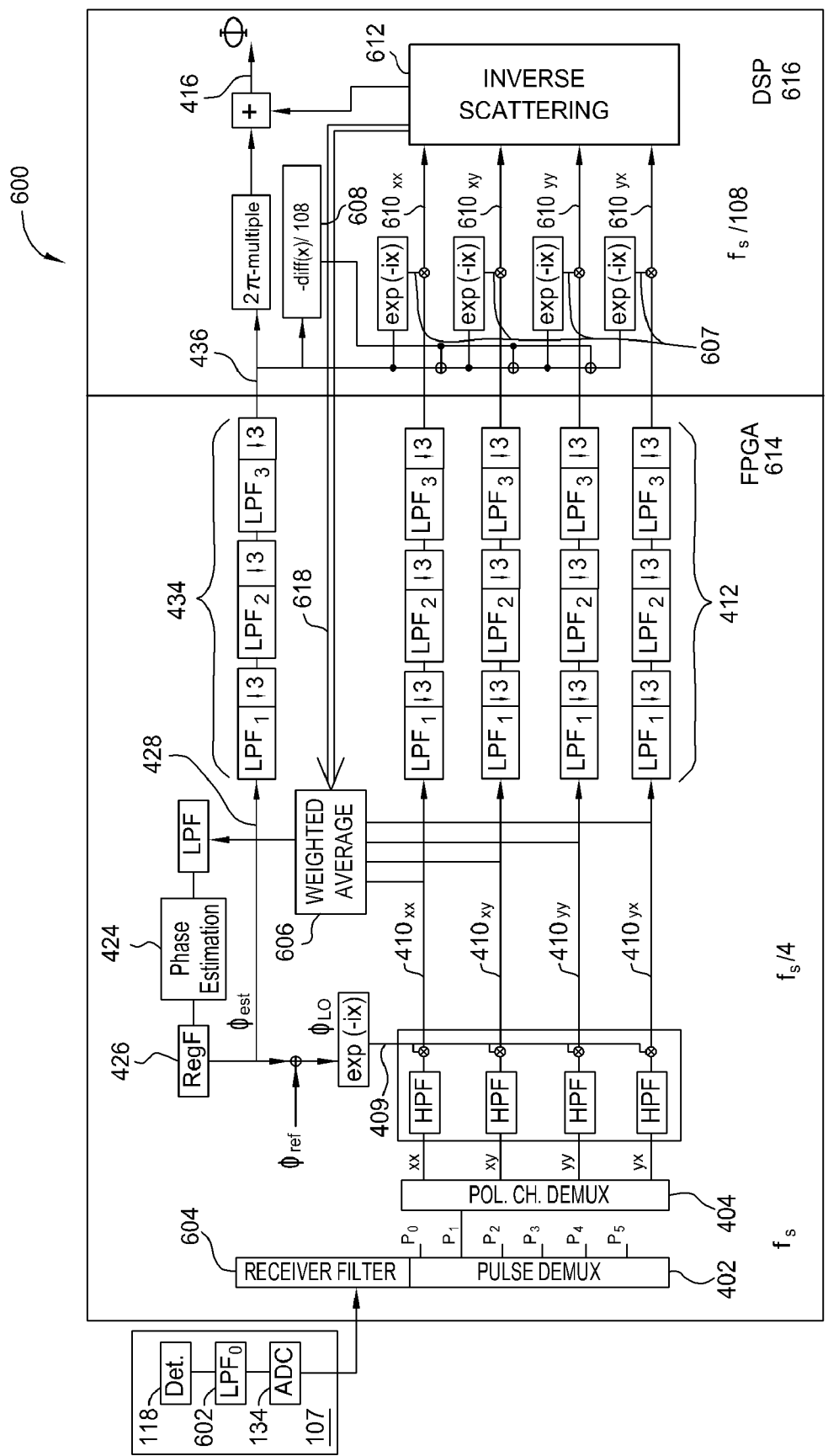

FIG. 6B illustrates a more specific embodiment of adaptive mixing block diagram 600 of FIG. 6A where the functions are performed in more than one integrated circuit (IC). For example, steps 504 through 514 may be implemented in a field programmable gate array (FPGA) 614, while the combination of the decimated mixed signal phasor 414 and the decimated sensor phase estimate 436 to calculate the sensor phase 416 in step 516 may be implemented in a digital signal processor (DSP) 616. An FPGA is generally very flexible, scalable, and allows execution of several functions simultaneously. An FPGA may also be very useful for implementation of simple processing tasks at high speed that require significant computational resources, such as decimation and filtering. Calculation of a phase from a complex phasor or vice versa may be done on the FPGA using the well-known CORDIC algorithm. Once the data rate is sufficiently reduced by decimation, the DSP 616 may execute the remaining processing steps. Compared to the FPGA 614, the DSP 616 may be much easier to program and more suitable for complex processing tasks at lower data rates, such as inverse scattering.

In such embodiments, data from the demodulator in the FPGA 614 may be transmitted to the DSP 616 for further processing across a suitable interface, such as a plurality of serial ports. The DSP 616 may also transfer data, such as the weighting coefficients 618 for the weighted averager 606, to the FPGA 614 across the same or another interface, such as a parallel port. In FIG. 6B, the low pass filter/decimation stages 412, 434 decimate by a factor of 27 in three stages each having a decimation factor of 3 (i.e., $D_1=D_2=D_3=3$). For such embodiments, the effective rate of the sampled polarization channels may be $f_s/108$ and the diff(x)/$4D_1D_2D_3$ function 608 may be a diff(x)/108 function as shown.

Another Exemplary Method of Adaptive Mixing

Figure 4C:
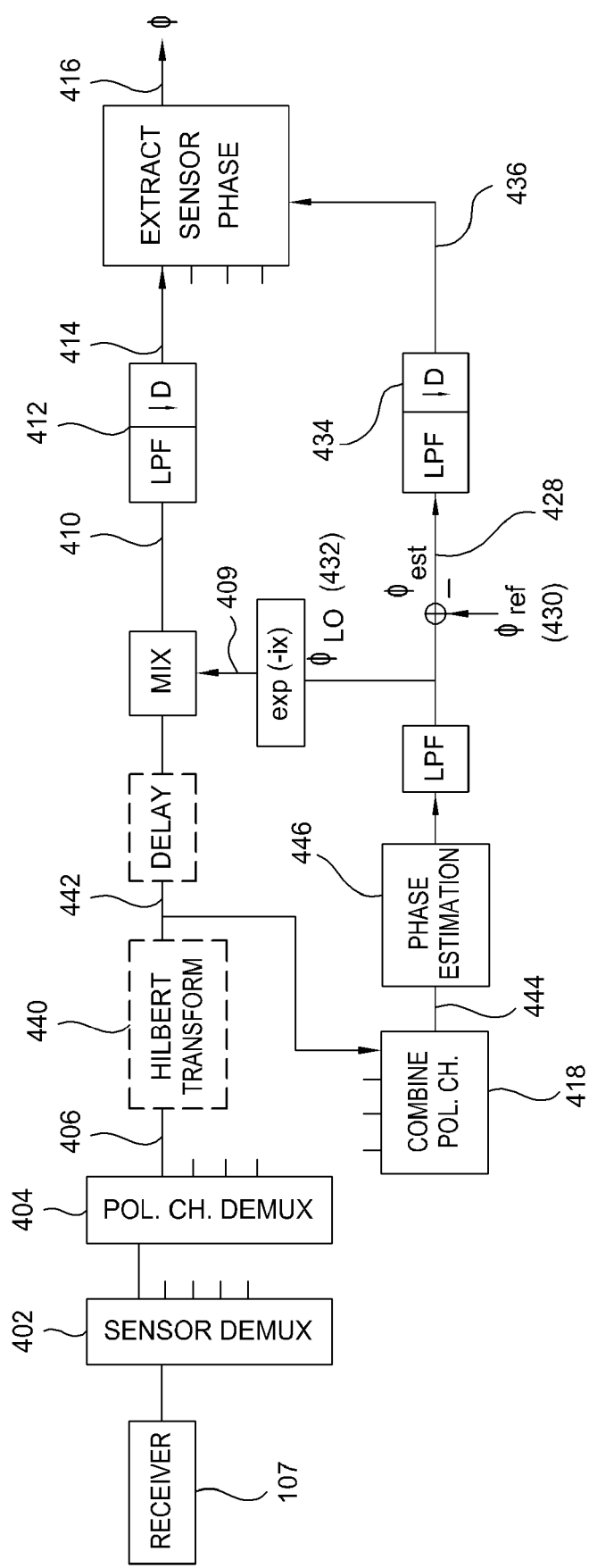
Figure 5B:
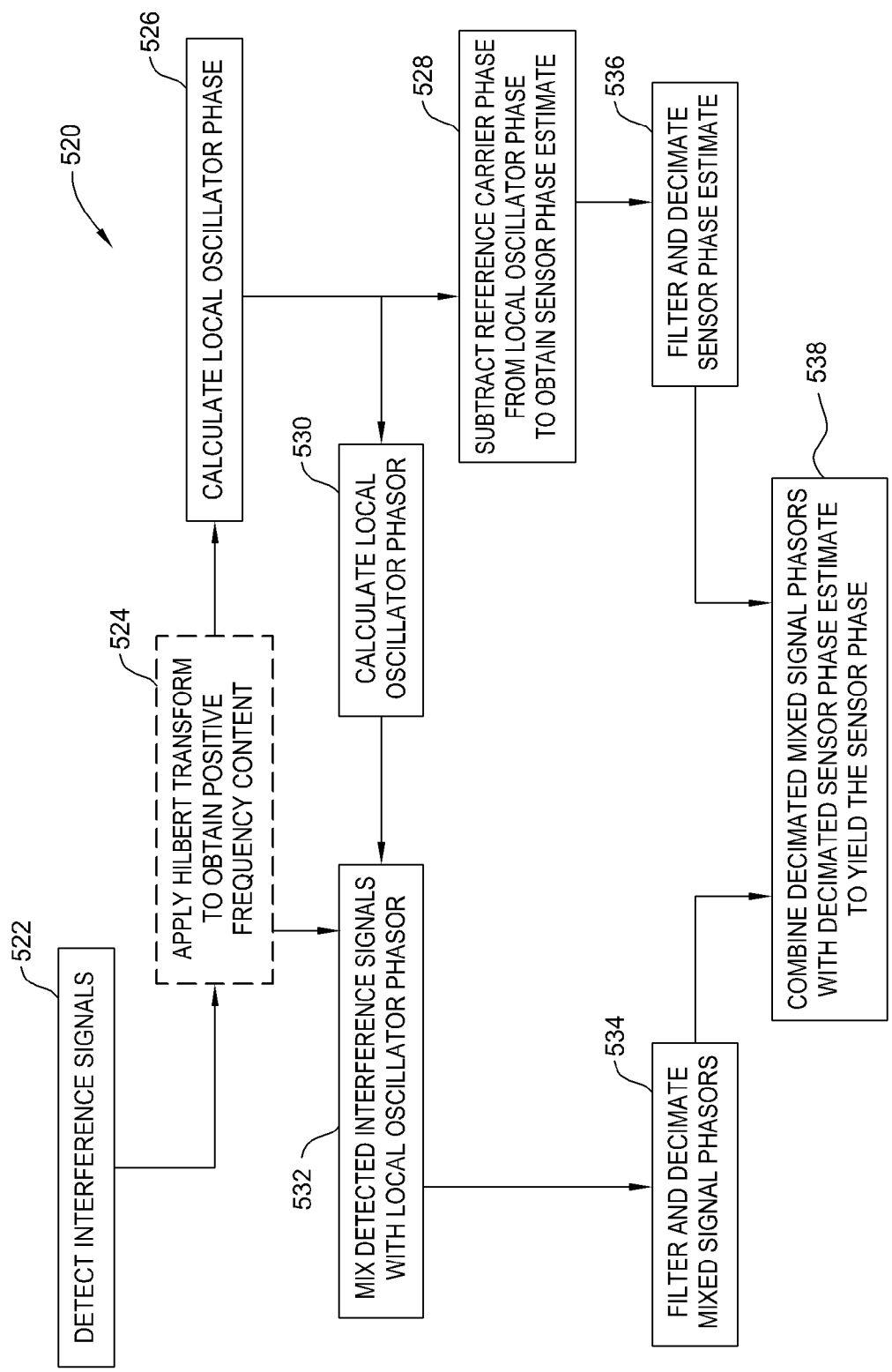

The block diagram of FIG. 4C and the flow diagram 520 of FIG. 5B illustrate a different approach to adaptive mixing in accordance with embodiments of the present invention, which may be considered as a feed-forward adaptive mixing technique. Rather than calculating the sensor phase estimate in a feedback loop after mixing occurs, the feed-forward technique may calculate the sensor phase estimate before mixing. With this approach, the stability of the adaptive mixing loop may be independent of the loop delay in the feedback loop. The adaptive mixing loop may not even be causal, meaning that samples of the fringe signal that are ahead (in time) of the current sample at the mixer input may be taken into account to calculate the sensor phase estimate.

In step 522, the receiver 107 may detect the reflected interferometric signals from the interferometric sensor(s) sampled at the sampling frequency ($f_s$) and may convert them to digital signals to be processed by the control and signal processing unit 122, for example. The received signals may be separated according to the associated sensor by the sensor demux 402 and according to the polarization channel by the polarization channel demux 404.

The input for phase calculation is typically complex, so an optional Hilbert transform 440 may be applied in step 524 in an effort to extract the positive frequency content of the polarization channel signal 406. For other embodiments, the frequency of the polarization channel signal 406 may be measured by determining the time delay between zero crossings, in which case a Hilbert transform need not be used.

In step 526, the transformed polarization channel signals 442 may be combined in a suitable manner, such as by a weighted average operation, in the polarization channel combiner 418 in an effort to provide a representative input 444 for phase estimation. The representative input 444 may be passed through the phase estimation block 446 and low pass filtered, such as by an FIR filter, to produce the local oscillator phase ($\phi_{LO}$) 432. For some embodiments, the polarization channel combiner 418 and phase estimation block 446 may comprise calculating the phase of the determinant ($D=S_{xx,t}S_{yy,t}-S_{xy,t}S_{yx,t}$) of the transformed polarization channel signals 442.

In step 528, the reference carrier phase ($\phi_{ref}$) 430 may be subtracted from the local oscillator phase 432 to obtain the sensor phase estimate ($\phi_{est}$) 428. A local oscillator phasor 409 for mixing may be calculated from the local oscillator phase ($\phi_{LO}$) 432 in step 530.

In step 532, a delayed version of the transformed polarization channel signal 442 may be mixed with the local oscillator phasor 409 to generate a mixed signal 410. This delay should compensate for the group delay of processing steps 526 and 530. The mixed signals 410, representing a difference frequency between the detected fringe frequency and the local oscillator frequency, may be low pass filtered and decimated by a factor D in one or more digital low pass/decimation filters 412 in step 534. The sensor phase estimate ($\phi_{est}$) 428 may also be low pass filtered and decimated by the same factor D in one more digital low pass decimation filters 434 similar to decimation filters 412 in step 536. In step 538, the sensor phase ($\Phi$) 416 may be extracted from the decimated mixed signal result 414 and the decimated sensor phase estimate 436 at this reduced sampling rate for a high resolution output signal with increased dynamic range when compared to conventional demodulation techniques, such as those illustrated in FIG. 4A.

An Exemplary Method of Non-Uniform Sampling

Figure 8A:
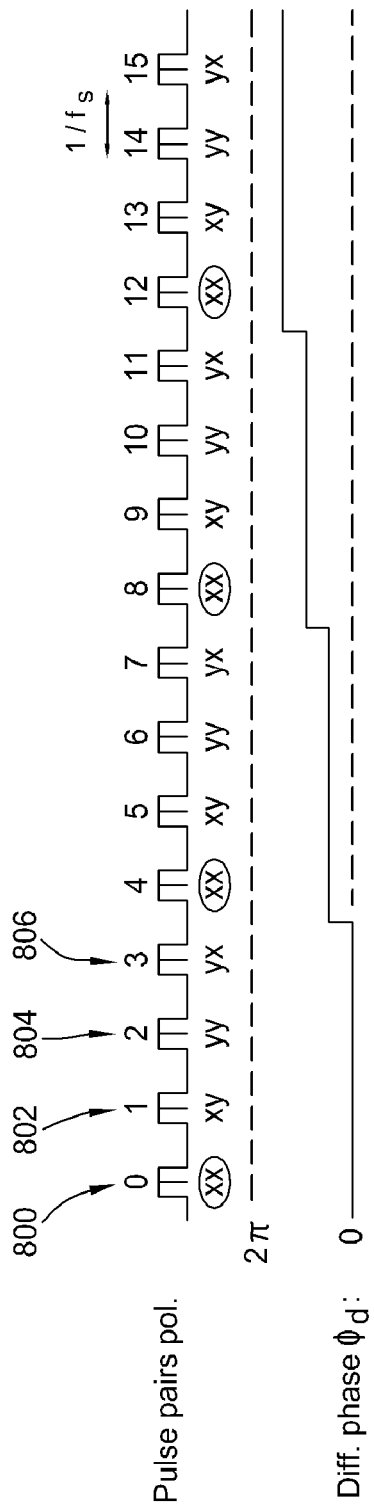
FIG. 8A illustrates a polarization and differential phase modulation scheme for uniform sampling in accordance with an embodiment of the present invention.

A polarization and differential phase modulation scheme as described in U.S. Pat. No. 7,081,959, entitled "Method and Apparatus for Providing Polarization Insensitive Signal Processing for Interferometric Sensors," herein incorporated by reference, is illustrated in FIG. 8A. In this scheme, the polarization modulator 106 may switch the transmitter output state of polarization (SOP) between two orthogonal polarization states x and y. In a sequence of four consecutive pulse pairs, both pulses of the first pulse pair 800 may be x-polarized. The first pulse of the second pulse pair 802 may be x-polarized, and the second may be y-polarized. Both pulses of the third pulse pair 804 may be y-polarized. The first pulse of the fourth pulse pair 806 may be y-polarized, and the second pulse may be x-polarized. Although these four pulse pairs 800-806 have a specific order to be maintained, those skilled in art understand that the order of these four pulse pairs is arbitrary. All pulse pairs in the sequence of pulse pairs that have the same SOPs define a polarization channel. These four channels may be denoted xx, xy, yy, and yx.

A full modulation period is shown in FIG. 8A, where each different sequence of four pulse pairs may be modulated by a different differential phase $\phi_d$ (e.g., 0, $\pi/2$, $\pi$, and $3\pi/2$). As used herein, differential phase generally refers to a difference in phase between two pulses in the same pulse pair. This differential phase modulation may repeat every sixteen pulse pairs (i.e., 4 different phases with 4 pulse pairs per sequence and 1 sequence per phase) so that the subcarrier frequency ($f_{sc}$) equals $f_s/16$. The period between the pulse pairs may be the inverse of the sampling frequency ($1/f_s$) as shown.

The Nyquist sampling theorem states that a real sampled signal can be reconstructed without ambiguity only if the original signal is restricted to a frequency range $0<f<f_{Nyq}$, where the Nyquist frequency ($f_{Nyq}$) is one half of the sampling frequency. With the modulation scheme described above, the sampling frequency per polarization channel is $f_s/4$, and fringe frequencies from DC to $f_{Nyq}=f_s/8$ can be demodulated. For example, a sampling frequency of approximately 800 kHz would be limited to $f_{Nyq}=100$ kHz such that the sensor slew rate must be in the range −50 to 50 kHz for correct reconstruction. Even though each of the polarization channels includes information about the sensor phase, the data from the polarization channels cannot be directly combined to increase the sampling rate since they typically have different amplitude and offset phase. In more conventional interrogation methods, the sensor is interrogated by only one polarization, leading to fading problems and polarization-induced noise. However, an advantage of these conventional methods is that the Nyquist frequency is $f_s/2$ (rather than $f_s/8$), which allows for a reconstructed frequency range that is 4 times larger.

An advantage with a uniform sample rate is that the mathematics involved in reconstructing the signal is straightforward and relatively simple. An important disadvantage, however, is that the sampling process—which may be represented in the time domain as a multiplication with a periodic pulse train of Dirac-delta pulses—causes periodic aliasing in the two-sided frequency domain (i.e., positive and negative frequencies) through convolution with the Fourier transform of the Dirac-delta pulse train.

In interferometric applications such as OBS, the sampled signals are concentrated around the positive and negative fringe frequency ($\pm f_{FR}$) and around DC, and the desired signal for extraction is the positive fringe frequency ($f_{FR}$). However, around the Nyquist frequency of the individual polarization channels ($f_{Nyq}=f_s/8$), it is not possible to separate the positive and the aliased negative fringe frequency component. Therefore, an additional requirement for unambiguous reconstruction of uniformly sampled data emerges: none of the signal frequency bands that contain the signal are allowed to overlap with aliased components of any of the other signal frequency bands.

A more generalized version of the sampling theorem states that a real signal can be reconstructed only if the original signal is restricted to one or more known signal frequency bands with a total bandwidth smaller than $f_{Nyq}$. In general, the sample rate may be non-uniform with time, and $f_{Nyq}$ may be defined as one half the mean sampling frequency. If non-uniform sampling is used that is not synchronized to a period clock, the signal spectrum will be convolved in the sampling process with the Fourier transform of a non-periodic set of Dirac-delta pulses representing the sampling instances. In general, this allows for reconstruction of a known total signal bandwidth $f_{Nyq}$ without restrictions related to the distribution of the individual signal bands in the signal spectrum.

Figure 8B:
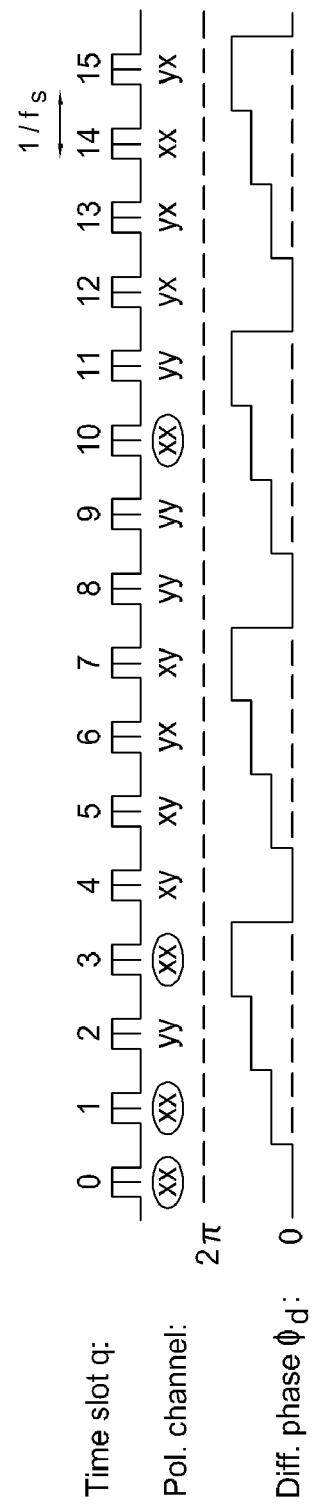
FIG. 8B illustrates a polarization and differential phase modulation scheme for non-uniform sampling in accordance with an embodiment of the present invention.

In an effort to overcome the limitations in the reconstructed frequency range imposed by using multiple polarization channels, FIG. 8B illustrates a polarization and differential phase modulation scheme for non-uniform sampling, or "syncopated sampling," in accordance with an embodiment of the present invention. This non-uniform sampling pattern may be the same for all of the polarization channels, and the modulation scheme should be repeated during sensor interrogation. As illustrated, the interrogation pulse pairs may still be aligned with a uniform TDM sampling period ($1/f_s$), and the period of the sampling pattern may still be $16/f_s$, as in the modulation scheme of FIG. 8A.

However, in the syncopated sampling pattern of FIG. 8B, the phase is modulated every sampling period ($1/f_s$) leading to a subcarrier frequency ($f_{sc}$) equal to $f_s/4$. The sampling intervals for each polarization channel may vary between $1/f_s$ and $7/f_s$, ensuring that information is gathered both about high and low frequency components, and each polarization channel may be modulated by all four phases within the sampling pattern. For example, polarization channel xx may be modulated with a phase of 0 in time slot 0, with a phase of $\pi/2$ in time slot 1, with a phase of $3\pi/2$ in time slot 3, and with a phase of $\pi$ in time slot 10 as depicted.

The sampling pattern of a polarization channel in FIG. 8A has a period of $16/f_s$, which means that the fringe signal is aliased with intervals of $f_s/16$ in the frequency domain, and in view of the traditional sampling theorem, this would lead to unambiguous reconstruction of fringe signals in the range 0 to $f_s/32$, which is only ¼ of the range for a uniform sampling pattern. The generalized sampling theorem allows for reconstruction of one or more signal bands with a total bandwidth of $f_s/8$, but these bands may be anywhere in the spectrum. The bands that are to be reconstructed may even be allowed to vary with time.

With a non-uniform sampling pattern, aliased signal components that are shifted by different multiples of $f_s/16$ will have different amplitudes and phase shifts compared to the "true" non-aliased signal component that would have been resolved with a much higher sampling frequency. As will be shown below, it is possible to reconstruct the fringe signal component in a frequency band near the positive fringe frequency $+f_{FR}$, while suppressing aliasing from the DC component and the mirror fringe frequency $-f_{FR}$, as long as $f_{FR}$ stays within the range 0 to $f_s/2$. This may be achieved by choosing a suitable weighting which is applied to the four time slots of a polarization channel (i.e., time slots 0, 1, 3, and 10 for channel xx) before summing them to form a signal with sampling frequency $f_s/16$. The resulting complex signal, when shifted by the correct multiple of $f_s/16$, provides a representation of the positive fringe signal in the vicinity of $f_{FR}$. The weighting function selected may depend on the alias orders of the DC and mirror fringe frequency signal components that are to be suppressed. Therefore, fringe frequencies in the range 0 to $f_s/2$ may be reconstructed with the non-uniform sampling pattern.

However, the bandwidth of the reconstructed signal is only $f_s/16$, so that in order to reconstruct the whole range 0 to $f_s/2$, the instantaneous bandwidth of the fringe signal must be less than $f_s/16$, and the center of reconstructed signal band must approximately follow the fringe frequency $f_{FR}$. For example, a sampling frequency of approximately 800 kHz would be limited to $f_{Nyq}$=400 kHz, allowing for reconstruction of fringe frequencies approximately four times higher than those limited by the conventional uniform sampling pattern. To increase the fringe rate range even further, the TDM period may be varied with time for some embodiments.

The total range that can be reconstructed may be determined by the periodicity of the Fourier transform of the sampling pattern. This periodicity may be determined by the widest uniform sampling grid that includes all sampling instances. In the embodiment described above with respect to FIG. 8B, the sampling grid has a mask width of $1/f_s$, and the samples occur at, for example, grid positions 0, 1, 3, 10, . . . for the xx polarization channel. This indicates that fringe frequencies from 0 to $f_s/2$ can be reconstructed. To increase the reconstructed frequency range even further, the TDM period may be varied with time for some embodiments so that the mask width is reduced. For example, if the xx polarization channel is sampled at positions 0, 1, 3.5, and 10 in FIG. 8B, the widest uniform sampling grid that includes all sampling instances will have a period of $1/(2f_s)$, and the reconstructable frequencies will range from 0 to $f_s$.

The non-uniform sampling technique is not limited to the case of four polarization channels as described above. It may also be used with other techniques, such as splitting of the fringe signal from a sensor into several channels as described in U.S. Pat. No. 5,173,743, entitled "Fiber Optical Time-Division-Multiplexed Unbalanced Pulsed Interferometer with Polarization Fading Compensation," herein incorporated by reference. Therein, four polarization channels are used to eliminate the problems with polarization fading, as well as problems with polarization-induced noise. The non-uniform sampling technique may also be utilized in some embodiments where there is only one channel per sensor in an effort to reconstruct fringe rates beyond the range 0 to $f_s/2$ by varying the TDM period to increase the period of the Fourier transform of the sampling pattern.

An Exemplary Method of Signal Processing with Non-Uniform Sampling

Figure 9:
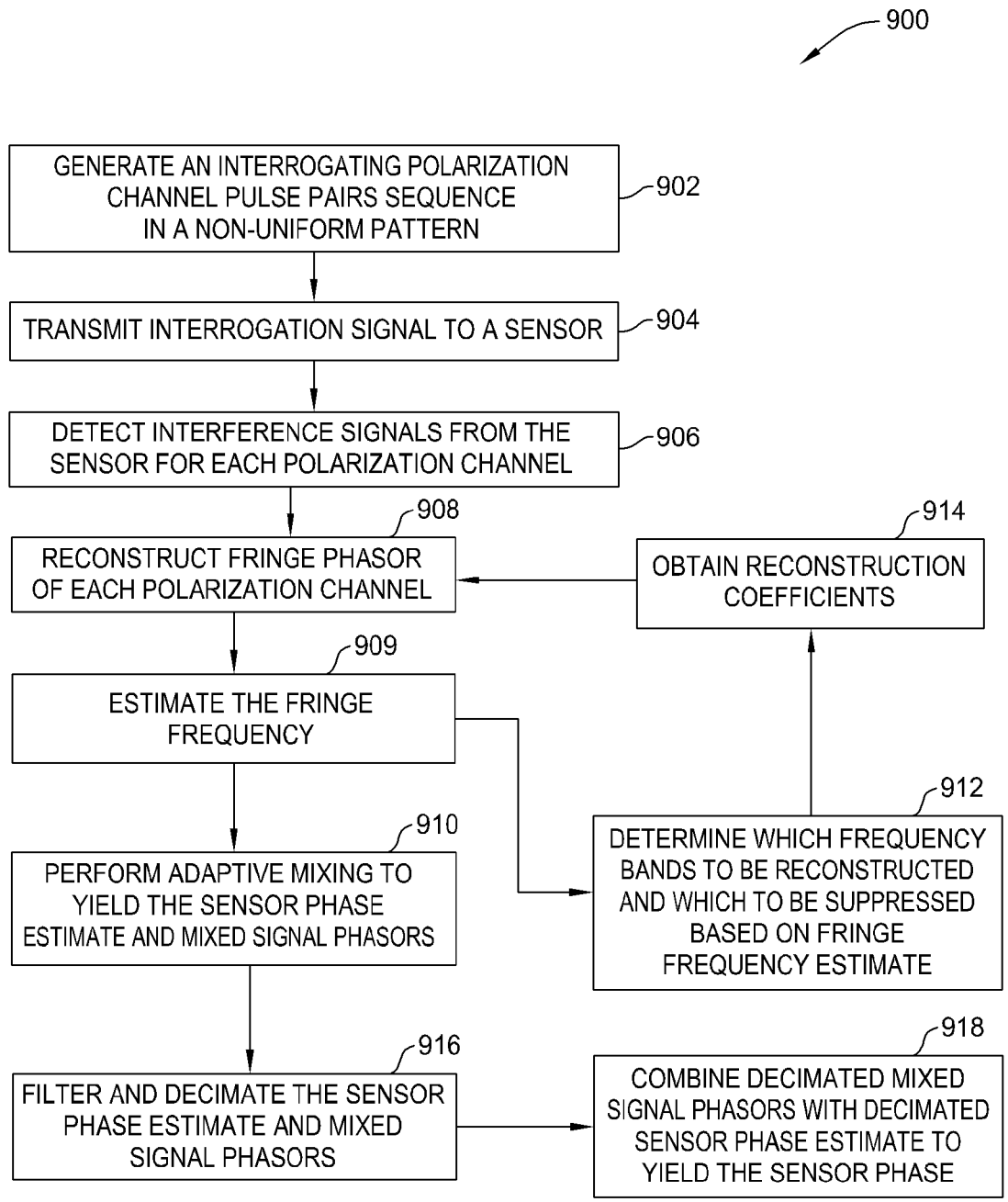
FIG. 9 is a flow diagram of determining a sensor phase using non-uniform sampling, reconstruction, and adaptive mixing in accordance with an embodiment of the present invention.
Figure 10:
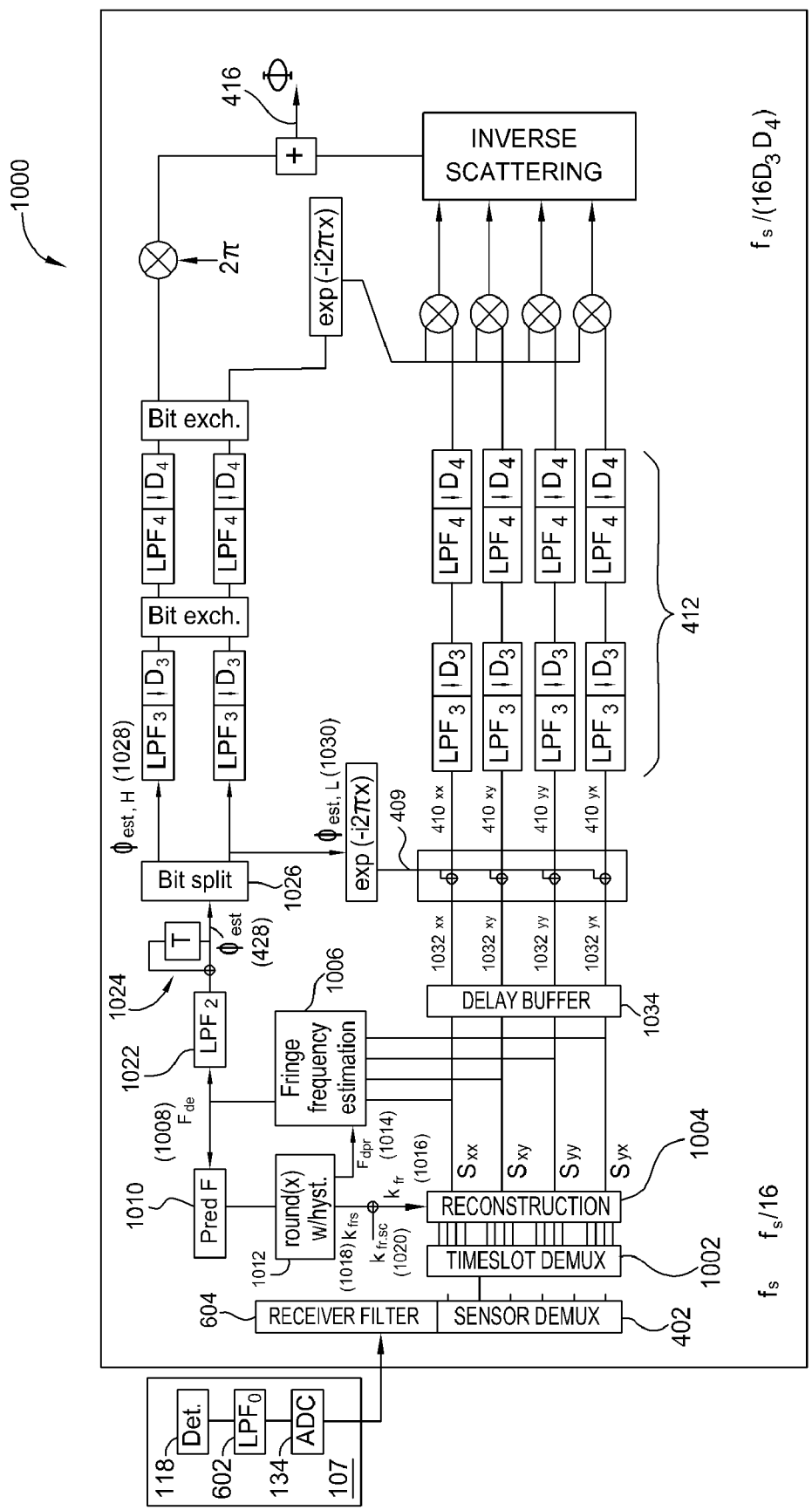
FIG. 10 illustrates an implementation of reconstruction and adaptive mixing that may be used with non-uniform sampling of an interferometric system in accordance with an embodiment of the present invention.

FIG. 9 is a flow diagram 900 for determining a sensor phase using non-uniform sampling, reconstruction, and adaptive mixing corresponding to the block diagram 1000 of FIG. 10. In step 902, an interrogating polarization channel pulse pairs sequence may be generated in a non-uniform sampling pattern, such as the polarization and differential phase modulation scheme for non-uniform sampling in FIG. 8B. The interrogation sequence may be generated in the CPU 124 or stored in the memory 128 of the control and signal processing unit 122.

In step 904, the interrogation signal comprising the polarization channel pulse pairs may be transmitted to a sensor, such as a Fabry-Perot sensor functioning as a hydrophone 230 or an accelerometer 220, at a certain wavelength. To transmit the signal, the interrogation sequence from the control and signal processing unit 122 may be used to control the pulse shaper 103, the phase modulator 105, and the polarization modulator 106 in an effort to vary the on/off optical states, the phase, and the polarization, respectively, as dictated by the polarization channel pulse pairs sequence. The gratings, such as fiber Bragg gratings (FBGs), of the sensor may reflect the pulsed light to provide interference signals as described above.

The interference signals may be detected in step 906 by the receiver 107. As described above for the implementation of adaptive mixing in FIG. 6A and illustrated in FIG. 10, the digitized output of the receiver 107 may be coupled to a digital receiver filter 604, which may apply a sampling impulse response in extracting the peak amplitudes of the detected and filtered interference pulses at appropriate times in an effort to produce a number (e.g., five are shown, one for each sensor) of output pulse samples with clock rate $f_s$. The impulse response length of the receiver filter 604 may be between 30 and 40 samples, for example. The pulse samples may be distributed to different sensor processing channels by the sensor demux 402, which may be integrated with the receiver filter 604 as depicted, for selecting one sensor interference pulse for each sensor within each TDM period. Data for a single sensor from the sensor demux 402 may be transmitted to a time-slot demux 1002, where each time-slot signal is output to a reconstruction block 1004. Each pulse pair in the interrogation sequence for non-uniform sampling may correspond to a separate time slot; therefore, $N_{slot}$=16 time-slot signals may be output from the time-slot demux 1002 corresponding to the sixteen pulse pairs of the syncopated sampling pattern illustrated in FIG. 8B.

The non-uniform sampling technique is not limited to 16 time slots. Those skilled in the art will realize that the number of time slots may be determined by the product of the number of polarization channels and the number of differential phase values per polarization channel. For some embodiments, one may choose to split into more time slots, such as 32.

The time discrete signal belonging to time slot q may be written $$S_q(n) = S(n)\delta_{16}(n-q) \quad (2)$$
$$= S_p(n)\delta_{16}(n-q); q \in Q_p$$

where $S(n)$ with sampling frequency $f_s$ is the TDM multiplexed signal containing all 16 time slots, and $\delta_{16}$ is a periodic delta function with Dirac-delta pulses occurring at multiples of 16. Thus, $S_q(n)$ has the same sampling frequency as $S(n)$, but only every $16^{th}$ sample is nonzero. $S_p(n)$ is the fringe signal from polarization channel p that would be obtained with the full sample rate $f_s$. $Q_p$ is the set of four time slots belonging to polarization channel p, and from the condition in the second line of the equation, p must be selected such that the time slot q is an element of the set of four time slots $Q_p$.

The Fourier transform of Equation (2) may be written as $$S_q(F) = S(F) \otimes \delta_{1/16} e^{-i2\pi qF} = \sum_{j=0}^{15} S\left(F - \frac{j}{16}\right) e^{-i2\pi jq/16} \quad (3)$$

where $F=f/f_s$ is frequency normalized relative to the sampling frequency, implying that the spectrum $S(F)$ is periodic with period 1. The summation over j represents aliasing of $S(F)$ from 16 alias orders due to the sub-sampling of every $16^{th}$ sample in the discrete time domain.

In step 908, the time-slot signals may be reconstructed according to the algorithms in the reconstruction block 1004, and the four time slots of each polarization channel may be combined in an effort to generate the sampled fringe signals (the fringe phasors) from each polarization channel (e.g., $S_{xx}$, $S_{xy}$, $S_{yy}$, and $S_{yx}$). The reconstruction block 1004 may decimate the fringe signal by a factor 16 such that the output has a sampling frequency of $f_s/16$. The desired output from reconstruction may be the positive fringe frequency for each of the polarization channels. Techniques for reconstruction will be described in greater detail below.

An estimate of the fringe frequency may be obtained from the reconstructed fringe phasors in step 909. Within the fringe frequency estimation block 1006, at least two approaches exist for estimating the fringe frequency based on either the Jones matrix determinant ($D=S_{xx,r}S_{yy,r}-S_{xy,r}S_{yx,r}$ where $S_{p,r}$ is the reconstructed signal for polarization channel p) or a weighted average ($A=w_1S_{xx,r}+w_2S_{xy,r}+w_3S_{yy,r}+w_4S_{yx,r}$). The weighted average approach has the disadvantage that the weighting coefficients may need to be uploaded from a suitable device, such as the DSP 616, which complicates the overall control of the processing including initialization and parameter updates. Furthermore, if the birefringence properties of the sensors and the lead fiber changes too quickly, updating of the weighting coefficients may become too slow to prevent fading of the visibility (i.e., the phasor amplitude) at the weighted average output.

With the Jones matrix determinant approach, the four polarization channel signals per sensor from the fringe reconstruction algorithm may be interpreted as a Jones matrix describing the difference between the two optical propagation paths through the demodulated sensor. An estimate for the sensor phase may be computed as one half of the phase of the complex determinant D. As described in U.S. Pat. No. 7,081,959, this calculation of the sensor phase may be insensitive to input polarization fluctuations and sensor birefringence such that fading of the fringe signal is avoided. The difference with the previous phase value is taken to produce $F_D$, which represents the fringe phase difference between the two sensor phases. The fringe phase difference $F_D$ derived from the determinant may have a range of only $\pm\pi/2$ and will wrap around at the range limits.

The fringe phase difference of the individual reconstructed polarization channel signals $S_{p,r}$ may have an output range of $\pm\pi$ and, thus, may be less prone to unwrapping errors when the fringe frequency changes rapidly. Therefore, a separate fringe phase difference estimate based on a combination of the phase of each polarization channel or one of the polarization channels with highest fringe amplitude may be calculated, and this may be used to assist the unwrapping of the fringe phase difference derived from the determinant. The fringe phase difference $F_D$ may be sampled at a fringe rate of $f_s/16$ such that $F_D=\pi$ corresponds to one half-revolution of the sensor phase sampled at $f_s/16$ or a sensor fringe frequency of $f_s/32$. From the fringe phase difference, an estimate of the fringe frequency ($F_{de}$ 1008) within the range 0 to $f_s/2$ may be found by unwrapping the fringe phase difference based on the previous fringe frequency estimate or a forward predicted estimate of the fringe frequency.

In step 912, $F_{de}$ 1008 may also be filtered in a prediction filter (PredF 1010 and "round(x) w/hyst." block 1012) in an effort to produce an estimate $F_{dpr}$ 1014 for the value that $F_{de}$ will take in the next iteration and to determine the fringe frequency index $k_{fr}$ 1016 that corresponds to the nearest reconstruction sub-band, described in detail along with the reconstruction technique. PredF 1010 may be implemented by any suitable filter, such as a simple FIR filter designed to estimate the next sample based on the trend of previous samples, or a more sophisticated filter such as a Kalman filter that predicts the next sample based on the statistical properties of the sensor signal. The "round(x) w/hyst." block 1012 may output both the predicted frequency $F_{dpr}$ 1014 and a sensor fringe frequency index ($k_{frs}$) 1018, which is simply an offset version of $k_{fr}$ 1016. Hysteresis may be applied to the output of PredF 1010 so that $k_{frs}$ 1018 (followed subsequently by $k_{fr}$ 1016) is updated only if the filter output deviates from the center frequency corresponding to the previous $k_{frs}$ by more than a selected hysteresis threshold. $k_{frs}$ 1018 may be converted to the fringe frequency index $k_{fr}$ 1016 by adding $k_{fr\cdot sc}$ 1020, which is equivalent to adding the subcarrier frequency ($f_{sc}$) to $F_{de}$ 1008. $k_{fr}$ 1016 may be an unsigned positive integer, taking values ranging from 0 to 63, for example.

To determine which frequency bands are to be reconstructed and which should be suppressed, $k_{fr}$ 1016 may be input to a lookup table, for example, based on a reconstructed frequency band graph similar to the graph 1300 of FIG. 13, which will be described in greater detail below. The frequency bands that are to be reconstructed may vary with time as the fringe frequency estimate changes. The lookup table may be used to determine the alias orders designated for suppression during reconstruction.

In step 914, the reconstruction coefficients may be obtained based on the alias orders to be suppressed and may subsequently be used in the reconstruction of the fringe phasors for each polarization channel in step 908. For some embodiments, these coefficients may be obtained from a table. In some embodiments, the lookup table that determines the alias orders designated for suppression and the lookup table that determines the reconstruction coefficients from the alias orders may be combined into one table, such that the reconstruction coefficients may be extracted directly from the combined table with an index based on $k_{fr}$. For other embodiments, these coefficients may be calculated on-the-fly. The alias orders designated for suppression and hence, the corresponding reconstruction coefficients, may change as the fringe frequency estimate changes.

Adaptive mixing may be performed on the reconstructed polarization channels in step 910 in an effort to reduce the bandwidth of the reconstructed fringe phasors of the polarization channels. The estimated fringe frequency may be used to yield the sensor phase estimate ($\phi_{est}$) 428 and the mixed signal phasors 410. For some embodiments, adaptive mixing may be performed with a feedback loop after mixing the reconstructed polarization channels with the local oscillator phasor, as described above with respect to FIG. 4B. However, the feed-forward adaptive mixing technique described in association with FIG. 4C and shown in FIG. 10 may be preferred.

$F_{de}$ 1008 may be filtered by a suitable filter $LPF_2$ 1022, such as a FIR low pass filter, which may have a symmetric impulse response. The output of $LPF_2$ 1022 may be input to an integrator 1024 (consisting of delay register T as illustrated in FIG. 10) in an effort to produce the sensor phase estimate ($\phi_{est}$) 428. The output of the integrator 1024 may be split into two registers by the bit split block 1026 to form $\phi_{est,H}$ 1028 (comprising the most significant bits (MSBs)) and $\phi_{est,L}$ 1030 (comprising the least significant bits (LSBs)). The scaling of $\phi_{est}$ 428 may be such that $\phi_{est,L}$ 1030 has a range of $-\pi$ to $\pi$, while $\phi_{est,H}$ 1028 holds the number of whole revolutions. The local oscillator phasor 409 may be calculated from the wrapped sensor phase estimate ($\phi_{est,L}$) 1030 and mixed with delayed reconstructed signals 1032 to form mixed signals 410 in an effort to reduce the bandwidth of the signal for further decimation and processing as described above. To form the delayed reconstructed signals 1032, the reconstructed signals for each polarization channel may be delayed in a delay buffer 1034 by a number of sampling periods that equals the group delay in $LPF_2$ 1022 and the processing delay, for example.

The mixed signals 410, having a fringe frequency determined by the difference between the detected fringe frequency and the local oscillator frequency, may be low pass filtered and decimated by a factor D in one or more digital low pass/decimation filters 412 in step 916. In FIG. 10, a two-stage low pass/decimation filter topology (e.g., $LPF_3$ with $D_3$ and $LPF_4$ with $D_4$) is illustrated. The local oscillator phase 432 may be decimated and filtered through the similar decimation filters as the mixed signals, but may require a much larger dynamic range to handle the large range in sensor phase. Therefore, the two outputs from the bit split block 1026 ($\phi_{est,H}$ 1028 and $\phi_{est,L}$ 1030) may be filtered into a real and an imaginary channel of the decimation filters. As long as the multiplication results are not truncated inside the filter, the outputs from the two channels may be recombined.

In step 918, the sensor phase 416 may be extracted from the decimated mixed signals and the decimated sensor phase estimate in a similar fashion to the techniques described above with respect to step 516 in FIG. 5A. The non-uniform sampling pattern as described above may allow for unambiguous demodulation of fringe rates that exceed the conventional Nyquist frequency limit given as one half of the mean sampling frequency. In fact, fringe rates up to $\pm f_s/4$ may be achieved, about four times greater than the conventional fringe rate limit of $\pm f_s/16$.

An Exemplary Reconstruction Technique

Figure 11:
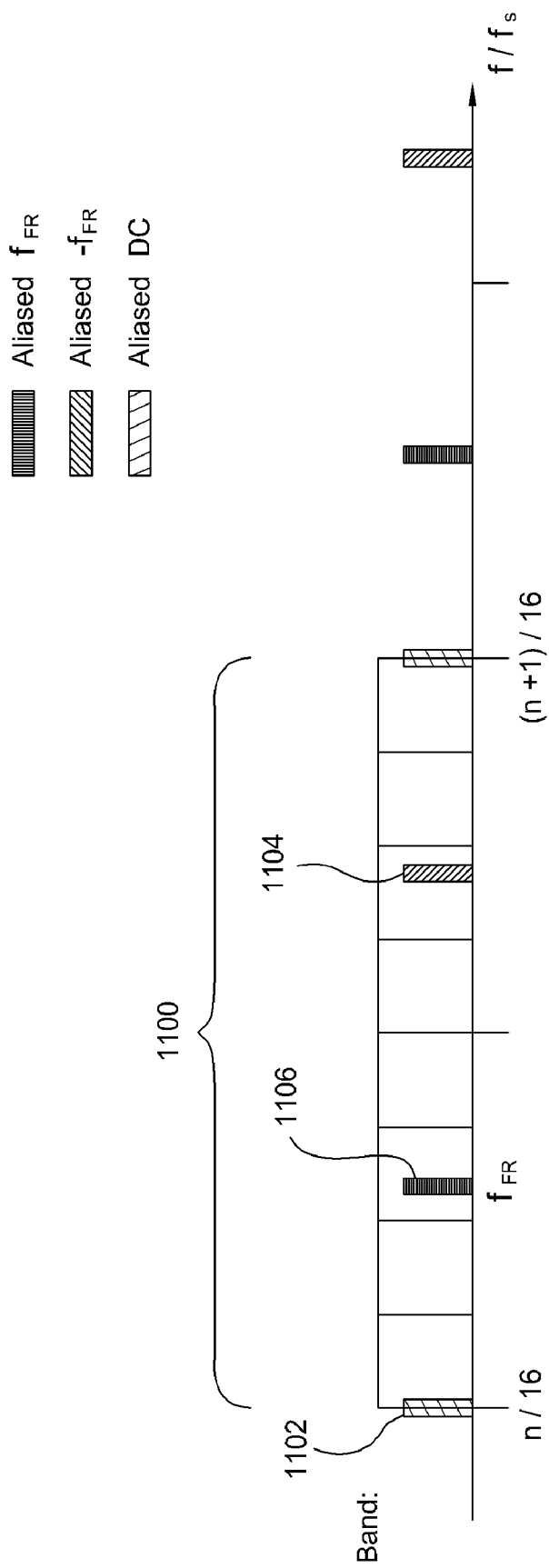
FIG. 11 illustrates aliasing of the fringe frequency and division of the time-slot signal into 8 sub-bands in accordance with an embodiment of the present invention.

Referring to FIG. 11, it may be assumed that unwanted signals that can be aliased to the fringe frequency band 1100 (e.g., DC signals 1102 and the aliased negative fringe frequency ($^-f_{FR}$) 1104) will always be contained within a total bandwidth of $f_s/N_{slot}=f_s/16$. During reconstructions, this bandwidth may be exploited to reconstruct a "Hilbert-transformed" one-sided frequency (i.e., positive frequency) representation of the fringe signal (i.e., just the positive fringe frequency ($^+f_{FR}$) 1106) within a moving frequency band of bandwidth $f_s/16$ that is always centered close to the fringe frequency. FIG. 11 illustrates an arbitrary alias order within the 16 alias orders bounded by $nf_s/16<f<(n+1)f_s/16$.

Depending on the actual fringe frequency, the relationship between the different time-slot signals may be different for the positive fringe frequency component, the negative fringe frequency component, and the DC component. In the reconstruction block 1004, the time-slot signals may be combined as a weighted sum into a complex decimated signal. By utilizing the relationship between the time-slot signals, it is possible to select the weighting coefficients (the reconstruction coefficients) in such a way that the negative fringe frequency component and the DC component will be suppressed while simultaneously decimating the combined signal by the factor $N_{slot}$.

For each frequency within the reconstructed band, it may be assumed that there exist only two other frequency bands with strong signal amplitudes that can be aliased to the reconstructed band, corresponding to two alias orders $j_0$ and $j_1$. With this assumption, only these two alias orders will be suppressed during the reconstruction. A signal component having an alias order j means that the aliased signal component is aliased j times such that the aliased signal component is shifted with a frequency $jf_s/16$ away from the original signal component sampled with a sampling frequency of $f_s$. A reconstructed signal for one polarization channel p where the alias orders $j_0$ and $j_1$ are removed may be written in the form:

$$S_{p,r} = \sum_{q \in Q_p} a_q S_q \quad (4)$$

where $Q_p$ is the time slots belong to polarization channel p and $a_q$ represents the reconstruction coefficients for time slot q. With the non-uniform sampling scheme proposed in FIG. 8B, $Q_{xx}=\{0, 1, 3, 10\}$, $Q_{xy}=\{4, 5, 7, 14\}$, $Q_{yy}=\{8, 9, 11, 2\}$, and $Q_{yx}=\{12, 13, 15, 6\}$. The reconstruction coefficients may be limited by the following conditions:

$$\sum_{q \in Q_p} a_q e^{-i\pi j_0 q/8} = 0; \quad (5)$$

$$\sum_{q \in Q_p} a_q e^{-i\pi j_1 q/8} = 0;$$

$$\sum_{q \in Q_p} a_q = 1;$$

$$\sum_{q \in Q_p} |a_q|^2 \text{ is minimized}$$

The above conditions may be satisfied by selecting the real and imaginary parts of the four complex coefficients $a_q$, $q \in Q_p$. The first two conditions ensure that alias orders $j_0$ and $j_1$ are eliminated, as can be seen by inserting Equation (3) into Equation (4). The third condition determines the scale factor of the non-aliased signal (j=0). The fourth condition ensures maximum signal-to-noise ratio (SNR) in the reconstructed signal. Solving the three first conditions lead to one (complex) degree in freedom for the optimization in the last condition. If only one alias order is to be removed ($j_0=j_1$), the last condition can be optimized within two degrees of freedom. If no alias orders are to be removed, all four reconstruction coefficients will be equal to 1. The equations in Equation (5) may be solved using linear algebra with a suitable software program, such as MATLAB®.

It was stated above that the generalized sampling theorem would permit reconstruction for a number of signal bands with a total bandwidth of $f_s/8$. However, in the present embodiment, a bandwidth of only $f_s/16$ can be reconstructed simultaneously. The reason is that Equation (5) requires at least 3 degrees of freedom (i.e., 3 polarization time slots per time-slot sequence) and a fourth degree of freedom is used to maximize the signal-to-noise ratio. For other embodiments, the degrees of freedom may be 2 or 3. If only one alias order is to be removed, it may be possible to achieve a total bandwidth close to the theoretical bandwidth of $f_s/8$ suggested by the generalized sampling theorem.

Figure 12A:
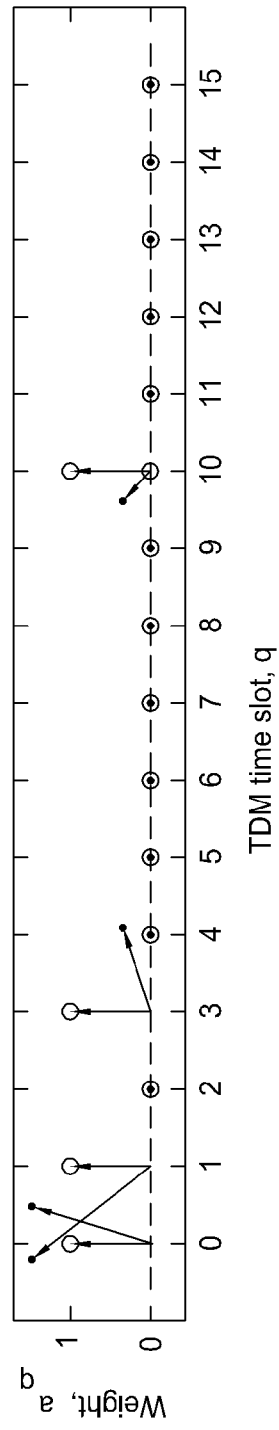
FIG. 12A illustrates exemplary weighting coefficients for each time-slot signal for the xx-polarization channel and the non-uniform sampling of FIG. 8B in accordance with an embodiment of the present invention.

An interpretation of Equation (4) is that the fringe samples $S_p(n)$ are multiplied by a periodic weighting signal which equals $a_q$ for $q \in Q_p$ and zero otherwise. Referring now to FIG. 12A, one period of the resulting weighting function is illustrated for p=xx for the cases with suppression of alias orders $j_0=5$ and $j_1=7$ and the case without any alias suppression. Each weight factor is illustrated as a phasor arrow, with vertical phasors corresponding to real numbers.

Multiplication with the periodic weighting function in FIG. 12A may correspond to a convolution on the frequency domain of $S_p$ with the Fourier transform of the periodic function, resulting in the following expression for aliasing into the reconstructed signal:

$$S_{p,r}(F) = \sum_{j=0}^{15} A_j S_p\left(F - \frac{j}{16}\right); \qquad (6)$$

$$A_j = \sum_{q \in Q_p} a_q e^{-i2\pi q j/16}$$

Figure 12B:
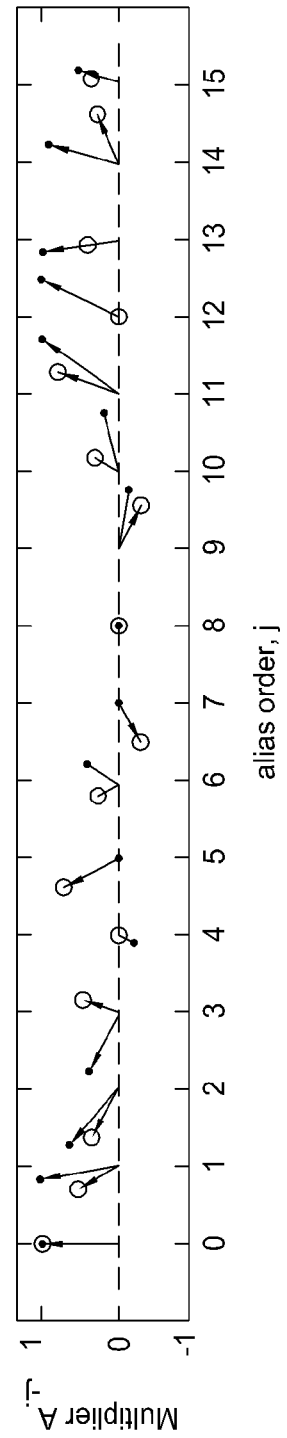
FIG. 12B illustrates complex scale factors for the alias orders resulting from a Fourier transform of the weighting coefficients of FIG. 12A in accordance with an embodiment of the present invention.

FIG. 12B portrays the resulting scaling of the alias orders from j=0 to 15 from the two sets of weighting coefficients shown in FIG. 12A. As intended, the scaling multipliers for j=5 and j=7 are zero for the case with alias suppression while the non-aliased signal with j=0 has a scale factor of 1.

Figure 13:
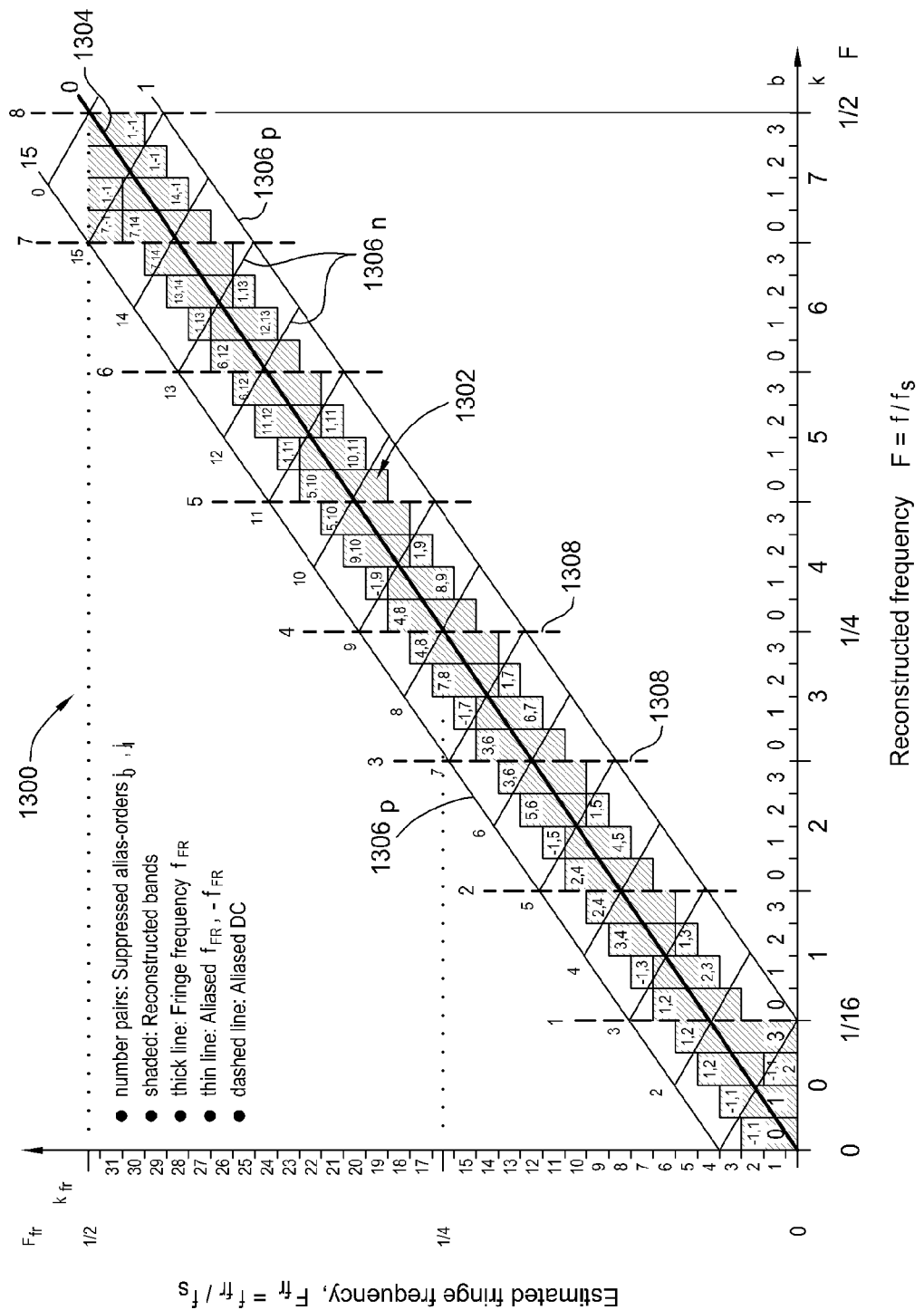
FIG. 13 is a graph for determining which alias orders to suppress based on the estimated fringe frequency where each time-slot signal is divided into 4 sub-bands in accordance with an embodiment of the present invention.

Referring now to FIG. 13, the desired output of the reconstruction block 1004 is a fringe signal reconstructed within a bandwidth $f_s/16$ in the vicinity of the fringe frequency $f_{FR}$, which typically varies with time. When $f_{FR}$ varies, the decimated alias order k and the alias orders designated for suppression ($j_0$ and $j_1$) will also most likely vary. In order to solve this challenge, each decimated alias order k (i.e., a frequency range from $kf_s/16$ to $[k+1]f_s/16$) may be divided into $N_b$ frequency sub-bands b=0 ... $N_b$-1, as illustrated along the horizontal axis in FIG. 13 for the case with $N_b=4$. In FIG. 11, the frequency band 1100 is divided into 8 frequency sub-bands numbered 0 to 7 as shown, rather than 4 frequency sub-bands numbered 0 to 3. As will be explained below, the total bandwidth of the sum of the sub-bands is approximately $(N_b-1)/N_b \cdot f_s/16$, so that the number of sub-bands may be a tradeoff between how wide of a bandwidth can be reconstructed simultaneously and computational resources required for processing a high number of sub-bands.

Returning to FIG. 13, the vertical axis may represent possible values of the normalized estimated fringe frequency $F_{fr}$ ($=f_{FR}/f_s$) or the corresponding fringe frequency index $k_{fr}$ 1016 at a given time. The shaded area 1302 in FIG. 13 shows which frequency sub-bands on the horizontal axis will be reconstructed for any given value of the estimate $f_{FR}$, which may be estimated in step 909 as described above. The reconstructed signal may thus cover $N_b$ sub-bands, which may be extracted by separate bandpass filters and processed with different alias suppression parameter sets ($j_0$, $j_1$) before the processed sub-bands are combined by summation. The reconstructed sub-bands may also belong to different decimated alias orders.

The thick line 1304 may indicate the position of the estimated fringe frequency $F_{fr}$, such that the reconstructed frequency F equals $F_{fr}$. If the estimated fringe frequency $F_{fr}$ is equal to the actual fringe frequency, the fringe signal will be in the center of the reconstructed band. In cases where there is a difference between the estimated and the actual fringe frequency, the fringe signal may be at the edge of the reconstructed band. If this offset becomes too large (typically $\geq f_s/32$), a large part of the fringe signal may be outside the reconstructed band, and then the fringe signal can most likely not be reconstructed. It is therefore important to find a good estimate of the fringe frequency. The instantaneous bandwidth of the fringe signal is given by the change of rate of the fringe frequency, i.e., the sweep rate. The instantaneous bandwidth should be smaller than the reconstructed bandwidth, which limits the allowed sweep rate of the fringe signal.

The thin lines 1306 illustrate alias versions of $f_{fr}$ (with positive sloping thin lines $1306_p$) with alias orders 15, 0, and 1 shown and its mirror image $-f_{fr}$ (with negative sloping thin lines $1306_n$) with alias orders 0 to 15 shown. The dashed lines 1308 show aliased versions of the DC component (alias orders 0 to 7). The numbers associated with the thin and dashed lines 1306, 1308 indicate the corresponding alias orders, and the numbers in the shaded area 1302 specify the alias orders to be suppressed ($j_0$, $j_1$) in each sub-band. Regions of the shaded area 1302 with different combinations of alias orders are separated with dotted lines.

The values for $j_0$ and $j_1$ that are suggested in the graph 1300 of FIG. 13 may generally be chosen as the alias orders for the thin lines ($f_{fr}$ and $-f_{fr}$ aliases) that are closest horizontally to the reconstructed frequency band. However, if a dashed line (DC alias) 1308 lies at the border of the sub-band, then suppression of the corresponding alias order may be prioritized in an effort to suppress both the negative fringe frequency component and the aliased DC component from the reconstructed signal.

The reconstructed signal $S_{p,r}$ in Equation (4) is complex with sampling rate $f_s$, although only the time slots $q \in Q_p$ belonging to polarization channel p are nonzero. The reconstructed frequency band, however, has a bandwidth of less than $f_s/16$, and this band can therefore be filtered out and decimated to the sampling rate $f_s/16$. The resulting reconstructed and decimated signal $S_{p,d}$ may then be an aliased representation of the signal bandwidth, shifted down by a multiple $j_k$ of $f_s/16$, where k is the decimation alias order. If the reconstructed frequency band crosses the border between different multiples of $f_s/16$, then k may vary across the reconstructed frequency range, as discussed above.

The filtering and decimation of $S_{p,r}$ may be done in principle by passing the signal through a bandpass filter and picking every $16^{th}$ sample from the result. Since only 4 out of 16 input time-slot signals are nonzero and since only every $16^{th}$ output sample is desired, the operation may be simplified. The nonzero time-slot signals may be decimated to $f_s/16$, and the resulting signals $S_{q,d}(m)=S_p(16m+q)$, $q \in Q_p$ may be passed through separate delay filters that compensate for the difference in sampling delays between the time slots.

A delay filter that produces a non-unitary delay (1-q/16) to compensate for the delay difference between the time slots with constant amplitude across the entire bandwidth of $f_s/16$ may require a long filter and consume considerable computational resources. It may be more efficient to split the delay filter into a number of sub-band filters and design these sub-band filters such that they can be combined to yield the expected frequency response of the delay filter.

Figure 14:
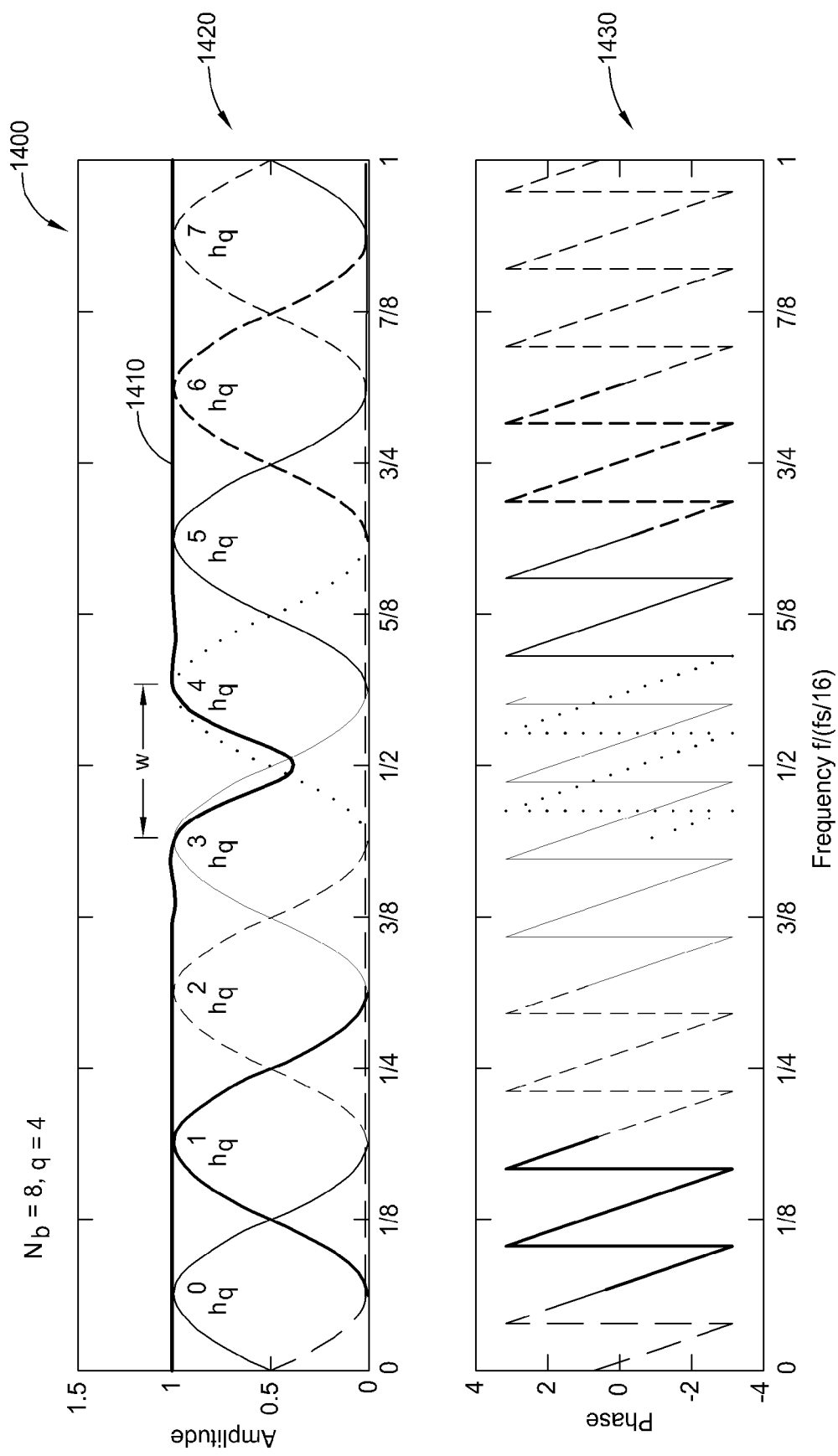
FIG. 14 illustrates the spectra of eight sub-band filters that may be applied to the time-slot signals in accordance with an embodiment of the present invention.

FIG. 14 depicts the spectra 1400 of the sub-band filters with overlapping transition bands for $N_b=8$ that may be applied to the time-slot signals with q=4. The spectral profile of the sub-band filters may have the form of a raised cosine as shown such that the sum 1410 of neighboring sub-bands is close to 1. Other designs may also be appropriate provided that the sum of overlapping spectrums of neighboring bands is approximately constant. However, a smooth spectral profile, such as the raised cosine profile, may be preferable since a smoother profile reduces the filter order. The amplitude responses 1420 for different time slots q may be similar, while the slope of the phase response 1430 may equal $-2\pi)1-q/16$) in an effort to remove the delay difference between the time-slot signals. A phase shift may be applied to the individual sub-band filters to have a continuous phase response.

However, since the phase slope is not an integer of $2\pi$, there will be a phase difference between two neighboring sub-bands somewhere in the spectrum, as shown here at $F=f/f_s=1/(2\cdot16)$, and the sum of the sub-bands is not constant around this frequency. The width (w) of this region may be approximately $1/(N_b\cdot16)$, such that the reconstructed bandwidth is $(N_b-1)/(N_b\cdot16)$. The point where this discontinuity appears in the spectrum may be shifted by changing the phase constant that is applied to the response of each sub-band filter, and this point should be chosen to be as far as possible from the estimated center of the signal that is to be reconstructed.

The point where this discontinuity appears in the spectrum may be changed by changing the phase constant that is applied to the response of each sub-band filter, and the point where this appears may be chosen as far as possible from the estimated center of the signal that should be reconstructed. The phase constant applied to the sub-band filters may be $\exp[-i2\pi q k_b/16]$, where $k_b$ is the alias order of the sub-band found in FIG. 13. This phase constant may be applied to the output of the filters, such that the filter coefficients need not be altered. For the case depicted in FIG. 14, the center of the frequency band is zero, so that the estimated fringe frequency should be close to $kf_s/16$, where k=0, ..., 7. For instance the estimated fringe frequency may be $f_s/4$, and the phase constant applied to sub-bands 0 to $N_b/2-1$ may be $\exp[-i2\pi q\cdot 4/16]$, while the phase constant applied to sub-bands $N_b/2$ to $N_b-1$ may be $\exp[-i2\pi q\cdot 3/16]$.

Figure 15:
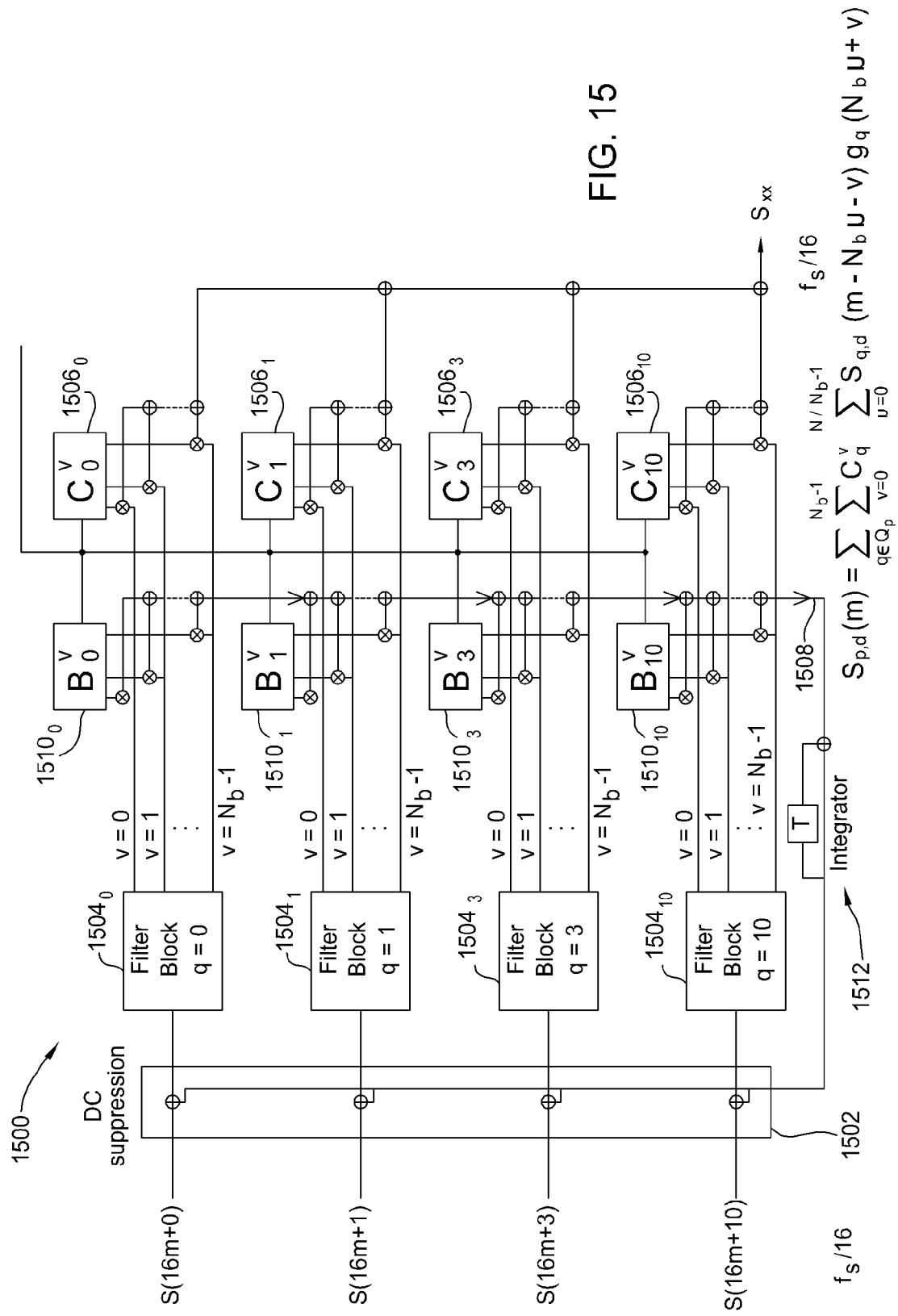
FIG. 15 is a detailed block diagram of a reconstruction processing module for the xx-polarization channel in accordance with an embodiment of the present invention.

As an example, FIG. 15 is a detailed block diagram 1500 of a reconstruction processing module for the xx-polarization channel. This block diagram 1500 may correspond to the upper quarter of the reconstruction block 1004 in FIG. 10. The DC component of the fringes may be removed at the input in a DC suppression block 1502 by a negative DC feedback, for example. Each signal may then enter a filter block $1504_0$, $1504_1$, $1504_3$, $1504_{10}$ with coefficients designed for that specific time slot q, where $Q_p=\{0, 1, 3, 10\}$ for polarization channel xx according to the non-uniform sampling pattern of FIG. 8B.

Shown in more detail in FIG. 15, there may be $N_b$ outputs from each filter block 1504. The reconstruction coefficients $C_q^v$ $1506_0$, $1506_1$, $1506_3$, $1506_{10}$ may be complex and may be calculated or selected from a lookup table depending on the estimated fringe frequency index $k_{fr}$ 1016 as described above with respect to FIG. 13. A second weighted average 1508 may also be calculated to extract the fringe DC component with suppressed aliasing of the fringe signal using weighting coefficients $B_q^v$ $1510_0$, $1510_1$, $1510_3$, $1510_{10}$. The BV coefficients 1510 may be real. The second weighted average 1508 may be fed back to the DC suppression block 1502 via a digital integrator filter 1512, such as an infinite impulse response (IIR) integrator filter. The sign and scale of the $B_q^v$ coefficients 1510 may be chosen to achieve correct feedback gain.

In order to calculate the decimated reconstructed polarization channel $S_{p,d}$ with different weighting coefficients for different sub-bands, the output from the DC suppression block 1502 may be passed through b=0 ... $N_b-1$ filters. Each filter should separate the corresponding frequency band b and compensate for the time slot delay q/16. The reconstruction and decimated fringe signal $S_{p,d}$ may now be calculated as $$S_{p,d}(m) = \sum_{q \in Q_p} \sum_{b=0}^{N_b-1} a_q^b \cdot e^{-i\frac{2\pi}{16}qk_b} S_{q,d}(m) \otimes h_q^b(m) \quad (7)$$

where $a_q^b$ is calculated according to Equation (5) with indexes $j_0$ and $j_1$ and alias index $k_b$ chosen from the diagram in FIG. 13, $h_q^b(m)$ is the sub-band filter of sub-band b and for time-slot q, and $$e^{-i\frac{2\pi}{16}qk_b}$$

is the phase constant applied to the sub-band filters. The symbol ⊗ denotes convolution. The inner sum of the signal from the individual sub-bands is summed, while the outer sum of the time-slots belonging to the polarization channel p is summed.

For some embodiments, the computation requirements may be significantly reduced by taking into account the similarities between the sub-band filters. As shown in FIG. 14, the sub-band filters may be shifted versions of each other, which means that each filter can be written in the form $$h_q^b(m) = h_q(m)\exp\left[i\frac{2\pi}{N_b}(b+1/2)m\right]\exp\left[i\frac{2\pi}{N_b}(b+1/2)(1-q/16)\right] \quad (8)$$

where $h_q(m)$ is a real filter centered around F=0. The factor $$\exp\left[i\frac{2\pi}{N_b}(b+1/2)m\right]$$

results in a shift in frequency of $f_s(b+½)/(16N_b)$, while the factor $$\exp\left[i\frac{2\pi}{N_b}(b+1/2)(1-q/16)\right]$$

provides equal phase of two overlapping sub-band filters as shown in FIG. 14. By setting $m=N_b\mu+v$, where v goes from 0 to $N_b-1$, the convolution with the sub-band filters in each filter block 1504 can be written as $$V_q^b(m) = S_{q,d}(m) \otimes h_q^b(m) \quad (9)$$

$$= \exp\left[i\frac{2\pi}{N_b}(b+1/2)(1-q/16)\right]\sum_{v=0}^{N_b-1}\sum_{\mu=0}^{N/N_b-1} S_{q,d}(m-N_b\mu-v)$$

-continued $$h_q(N_b\mu + v)\exp\left[i\frac{2\pi}{N_b}(b+1/2)(N_b\mu + v)\right]$$

$$= \exp\left[i\frac{2\pi}{N_b}(b+1/2)(1-q/16)\right]\sum_{v=0}^{N_b-1}\exp\left[i\frac{2\pi}{N_b}(b+1/2)v\right]$$

$$\sum_{\mu=0}^{N/N_b-1} S_{q,d}(m - N_b\mu - v)h_q(N_b\mu + v)(-1)^\mu$$

Here, N is the length of the filter and should be chosen so that $N/N_b$ is an integer. The inner convolution may be denoted as $$V_q^v(m) = \sum_{\mu=0}^{N/N_b-1} S_{q,d}(m - N_b\mu - v)g_q(N_b\mu + v), \quad (10)$$

where $g_q(N_b\mu+v)=h_q(N_b\mu+v)(-1)^\mu$. Thus, $V_q^v(m)$ may be produced by convolving $S_{q,d}$ with every $N_b$ sample of $h_q$ with an offset of $v$.

Figure 16:
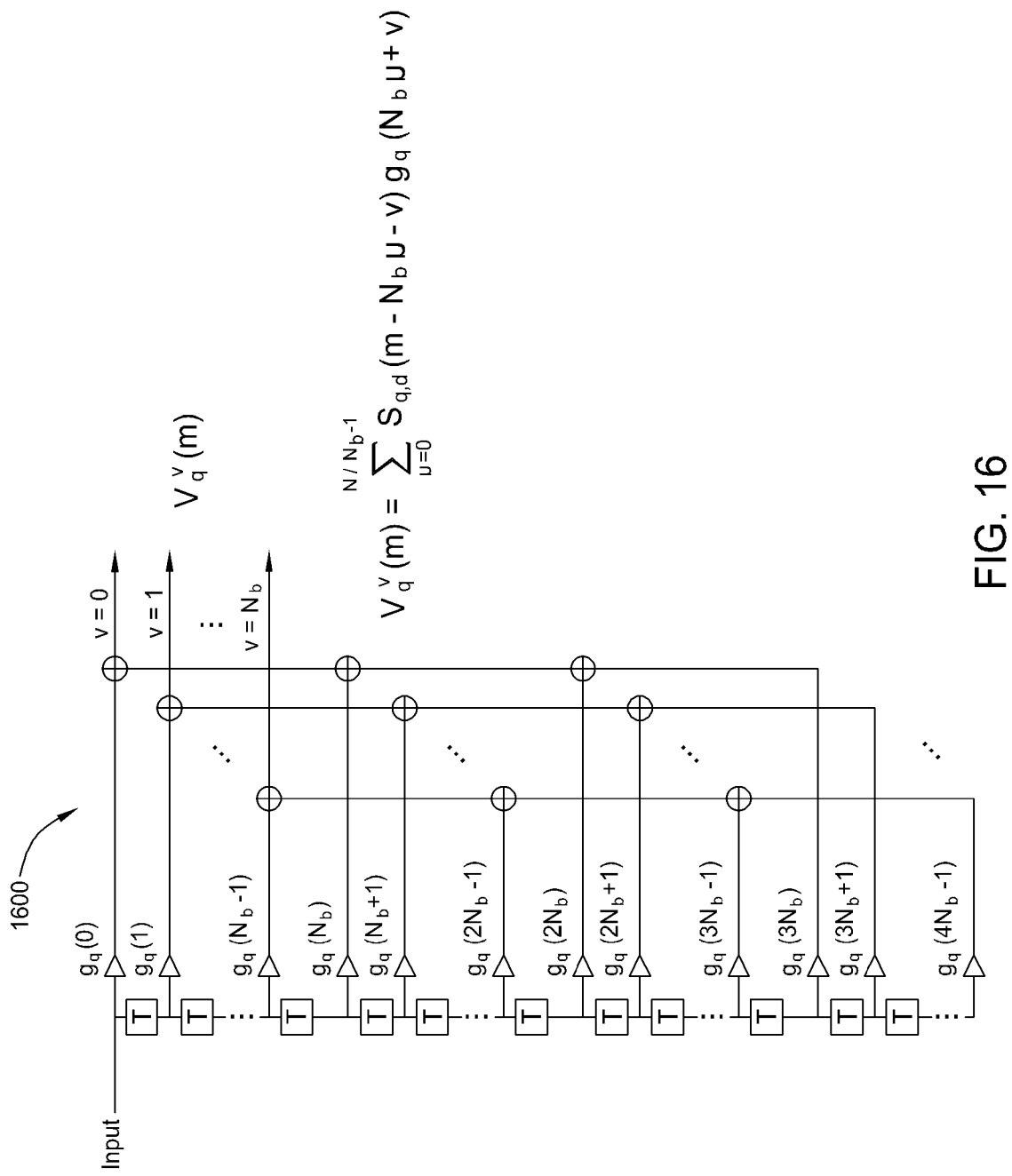
FIG. 16 illustrates an implementation of a convolution within a filter block of the reconstruction processing module of FIG. 15 for reduced computation requirements in accordance with an embodiment of the present invention.

FIG. 16 shows an implementation of this convolution. The structure 1600 is similar to an FIR filter with impulse response length $4N_b$. In comparison with the computation of $V_q^b(m)$, the number of multiplications is reduced by a factor $N_b$, and only real multiplications are involved, which both save a substantial amount of processing. With this efficient implementation of the convolution, $S_{p,d}(m)$ in Equation (7) may now be written as $$S_{p,d}(m) = \sum_{q \in Q_p} \sum_{v=0}^{N_b-1} C_q^v V_q^v(m) \quad (11)$$

where $$C_q^v = \sum_{b=0}^{N_b-1} a_q^b \exp\left[i\frac{2\pi}{N_b}(b+1/2)(1-q/16+v) - i\frac{2\pi}{16}qk_b\right] \quad (12)$$

The multiplications with $C_q^v$ and the outer summation in Equation (10) may be performed after the filter blocks as depicted in FIG. 15. The coefficient set $C_q^v$ at a particular point in time may be selected depending on $k_{fr}$, as described herein. The vertical axis in FIG. 13 may be divided into a number of regions numbered from $k_{fr}=0$ to $N_{fr}$. With the example of FIG. 13, the vertical axis is divided into 33 regions numbered from $k_{fr}=0$ to $N_{fr}=8N_b=32$ as shown.

For the $B_q^v$ coefficients, the two frequency bands around DC (i.e., b=0 and b=$N_b$-1) are of interest, so that only $a_q^0=a_q^{N_b-1}$ are nonzero. The indices $j_0$ and $j_1$ used for calculating $a_q^0$ may be found by drawing the thin lines $1306_p$ for alias orders of $f_{fr}$ and extending the thin lines $1306_n$ for alias orders of $-f_{fr}$ such that they cross the vertical axis in FIG. 13. Therefore, $$B_q^v = 2a_q^0 \cos\left(\frac{\pi}{N_b}\left(\frac{q}{16} - v - 1\right)\right) \quad (13)$$

There should be one set of $B_q^v$ and $C_q^v$ coefficients for each value of $k_{fr}$. The coefficients may be stored in a lookup table with one real entry of $B_q^v$ and one complex entry of $C_q^v$ for each combination of q, v, and $k_{fr}$.

It should be noted that the reconstruction techniques disclosed herein do not require a non-uniform sampling pattern, such as the polarization and differential phase modulation scheme depicted in FIG. 8B, and can be used with conventional uniform sampling patterns in an effort to provide the desired signal component(s), such as a positive fringe frequency component. For such embodiments, the time-slot demux 1002 may take the input signals for a given sensor and break them out differently for output to the reconstruction block 1004. The suppression of certain alias orders may most likely be different, as well, but a graph similar to FIG. 13 may be still be used to determine the desired suppressed alias orders and calculation of the reconstruction coefficients in a similar manner.

An Exemplary Nonlinear Adaptive Mixing Technique

Figure 17A:
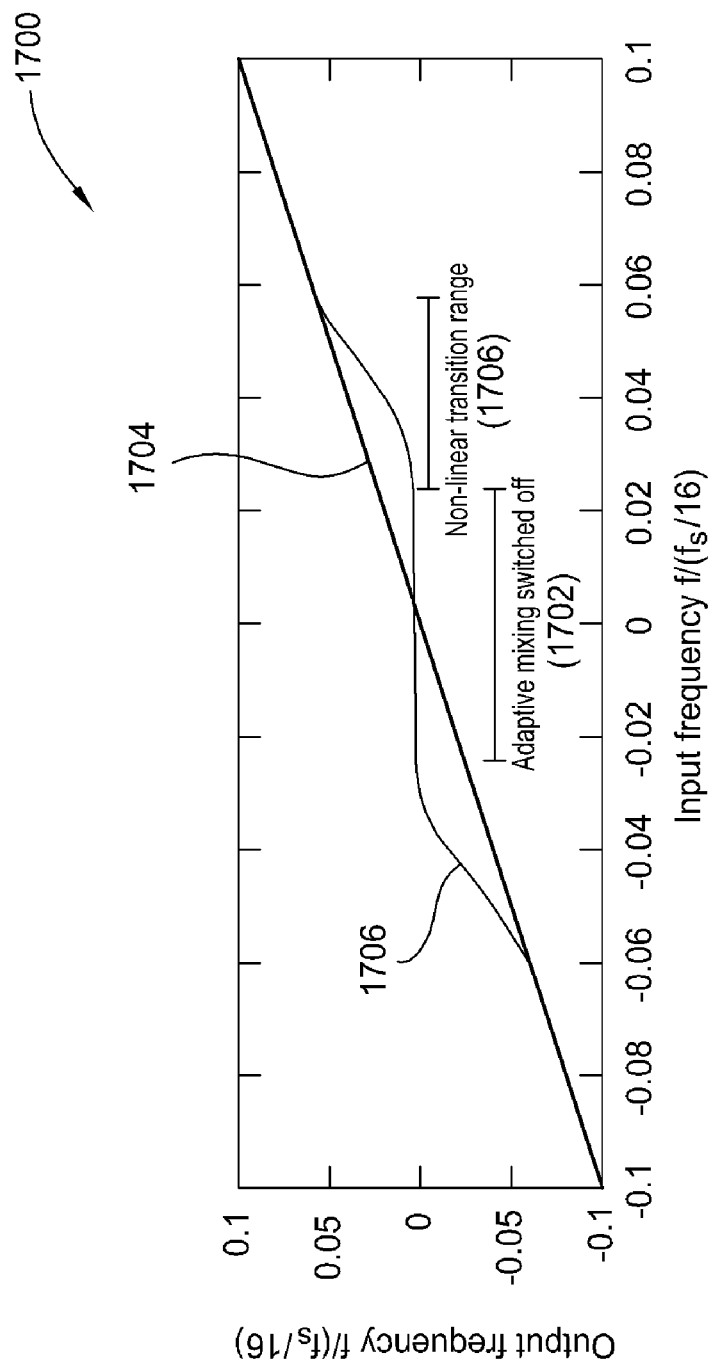
FIG. 17A is a graph of a nonlinear transform for adaptive mixing in accordance with an embodiment of the present invention.
Figure 17B:
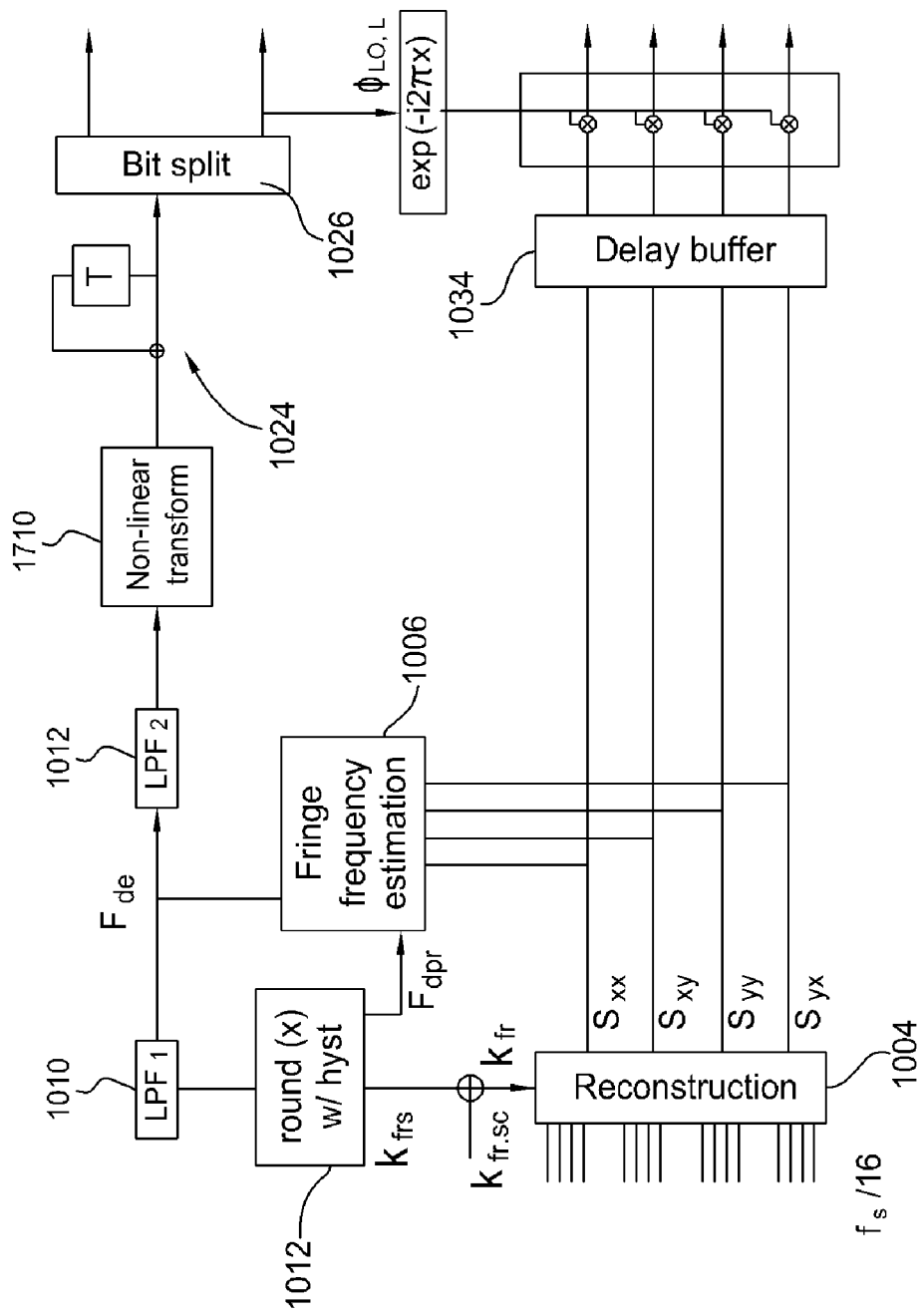
FIG. 17B is a block diagram for implementing the nonlinear transform for adaptive mixing of FIG. 17A in accordance with an embodiment of the present invention.

Due to ripple in the decimation filters 434, among other components of the digital signal processing chain, adaptive mixing may be switched off for small phase signal amplitudes as shown in the "Off" region 1702 of the graph 1700 of FIG. 17A for some embodiments. Ripple in the decimation filters with adaptive mixing may cause the layer-peeling algorithm not to function correctly in embodiments where the layer-peeling algorithm is used for inverse scattering. Therefore, a nonlinear transform 1710 may be implemented in the adaptive mixing loop according to the graph 1700. For some embodiments as shown in FIG. 17B, the nonlinear transform 1710 may be implemented between the $LPF_2$ 1022 and the integrator 1024 in the frequency domain.

Line 1704 illustrates a linear 1:1 correspondence between input frequencies and output frequencies if the nonlinear transform 1710 was not used or was bypassed. The nonlinear transform 1710 may force a small band of input fringe frequencies estimates near zero to be output with a fringe frequency estimate of 0. For some embodiments where the sampling frequency is about 820 kHz, the bandwidth of the "Off" region 1702 may be about ±1 kHz. To get back to the line 1704 where adaptive mixing functions to estimate the frequency normally, the nonlinear transform may include a non-linear transition region 1706 joining the line 1704 to the "Off" region 1702 for a continuous, monotonic transition rather than a piecewise linear function.

While the foregoing is directed to embodiments of the present invention, other and further embodiments of the invention may be devised without departing from the basic scope thereof, and the scope thereof is determined by the claims that follow.

The invention claimed is:
1. A method for detecting a sensor parameter dependent on an interferometer phase, the method comprising:
transmitting a plurality of interrogation signals having different combinations of polarization states to a sensor interferometer;
sampling interference signals received from the sensor interferometer in different polarization channels comprising interference between light components transmitted with the different combinations of polarization states to the sensor interferometer, wherein the sampling interval for the interference signals within each polarization channel is non-uniform with time; and
extracting an estimate for the sensor parameter from the sampled interference signals.

2. The method of claim 1, wherein extracting the estimate for the sensor parameter comprises:
    establishing a fringe frequency estimate;
    reconstructing fringe phasors for each of the non-uniformly sampled polarization channels based on the fringe frequency estimate;
    updating the fringe frequency estimate based on the phase of the reconstructed fringe phasors; and
    extracting the sensor parameter from the reconstructed fringe phasors.

3. The method of claim 1, wherein the interrogation signals comprise pulse pairs having the different combinations of polarization states corresponding to the different polarization channels, and wherein a separation between two pulses in each of the pulse pairs is approximately equal to a delay imbalance of the sensor interferometer.

4. The method of claim 3, wherein a combined set of the sampling intervals of the different polarization channels forms a uniform sampling period.

5. The method of claim 2, wherein reconstructing the fringe phasors comprises applying delay filters to one or more time slots of the sampled interference signals to obtain filtered time slot signals.

6. The method of claim 2, wherein reconstructing the fringe phasors comprises:
    determining frequency bands to be reconstructed and frequency bands to be suppressed based on the fringe frequency estimate; and
    obtaining reconstruction coefficients according to the frequency bands to be reconstructed and suppressed, wherein reconstructing the fringe phasor for each polarization channel comprises using the reconstruction coefficients.

7. The method of claim 6, wherein reconstructing the fringe phasor for each polarization channel comprises:
    multiplying the reconstruction coefficients with one or more filtered time slot signals; and
    summing the time slot signals for each polarization channel.

8. The method of claim 2, wherein updating the fringe frequency estimate comprises:
    forming a Jones matrix using the reconstructed fringe phasors, each from a different polarization channel;
    calculating a determinant of the Jones matrix; and
    obtaining the fringe frequency estimate from the phase of the determinant of the Jones matrix.

9. The method of claim 2, wherein extracting the sensor parameter comprises:
    obtaining a sensor phase or frequency estimate dependent on the phase of the reconstructed fringe phasors;
    obtaining a local oscillator phasor based on the sensor phase or frequency estimate; and
    mixing the local oscillator phasor with the reconstructed fringe phasor of each reconstructed polarization channel to yield mixed signal phasors.

10. The method of claim 2, wherein extracting the sensor parameter comprises:
    mixing the fringe phasors, one for each polarization channel, with a local oscillator phasor to yield the mixed signal phasors;
    generating the sensor phase estimate based on the mixed signal phasors; and
    calculating the local oscillator phasor based on the sensor phase estimate.

11. The method of claim 9, wherein extracting the sensor parameter comprises filtering and decimating the mixed signal phasors and the sensor phase estimate.

12. The method of claim 11, wherein extracting the sensor parameter comprises extracting the sensor phase from the decimated mixed signal phasors and the decimated sensor phase estimate.

13. The method of claim 12, wherein extracting the sensor phase comprises:
    constructing a sensor Jones matrix based on the decimated mixed signal phasors;
    calculating a determinant of the sensor Jones matrix;
    calculating a phase of the determinant; and
    adding the decimated sensor phase estimate to the phase of the determinant to obtain the sensor phase.

14. A method for interrogating an optical sensor, comprising:
    transmitting a sequence of optical signals to the optical sensor, wherein the sequence of optical signals is non-uniform with time, wherein the sequence of optical signals is a sequence of optical signals for a polarization channel; and
    sampling received signals from the optical sensor according to the transmitted sequence of optical signals.

15. The method of claim 14, wherein each optical signal in the sequence of optical signals for the polarization channel is modulated with a different phase.

16. The method of claim 14, wherein the optical signals are polarization pulse pairs.

17. A method for detecting a sensor parameter dependent on an interferometer phase, the method comprising:
    transmitting interrogation signals to a sensor interferometer, wherein the interrogation signals comprise pulse pairs that are non-uniformly distributed in time, and wherein a separation between two pulses in each of the pulse pairs is approximately equal to a delay imbalance of the sensor interferometer;
    sampling interference signals received from the sensor interferometer with a sampling interval that is non-uniform with time; and
    extracting an estimate for the sensor parameter from the sampled interference signals.

18. The method of claim 17, wherein the interference signals comprise fringes, and wherein extracting the estimate for the sensor parameter comprises:
    establishing a fringe frequency estimate;
    reconstructing a fringe phasor from the non-uniformly sampled interference signals based on the fringe frequency estimate; and
    updating the fringe frequency estimate based on the reconstructed fringe phasor.

19. An interferometric system comprising:
    an optical sensor, wherein the optical sensor comprises a fiber Bragg grating (FBG);
    a transmitter configured to transmit a sequence of optical signals to the optical sensor, wherein the sequence of optical signals is non-uniform with time;
    a receiver configured to detect interference signals produced by the optical sensor and the transmitted sequence of optical signals; and a signal processing unit configured to reconstruct the detected interference signals based on the transmitted non-uniform sequence of optical signals.

20. A method for detecting a sensor parameter dependent on a time varying sensor interferometer phase, the method comprising:

generating interrogation signals in the form of a sequence in a pattern that is non-uniform with time;

transmitting the interrogation signals to a sensor interferometer;

sampling interference signals received from the sensor interferometer with sampling intervals that are non-uniform with time; and extracting an estimate for the sensor parameter from the sampled interference signals.

21. The method of claim 20, wherein the time varying sensor interferometer phase is varied so that the phase changes by more than a half period during the longest of the sampling intervals.

* * * * *